US011643579B2

(12) United States Patent
Michoud et al.

(10) Patent No.: US 11,643,579 B2
(45) Date of Patent: May 9, 2023

(54) ADHESIVE COMPOSITION COMPRISING A PHOSPHATE SALT AND A THERMOSETTING RESIN

(71) Applicant: COMPAGNIE GENERALE DES ETABLISSEMENTS MICHELIN, Clermont-Ferrand (FR)

(72) Inventors: Clement Michoud, Clermont-Ferrand (FR); David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 341 days.

(21) Appl. No.: 16/651,165

(22) PCT Filed: Sep. 21, 2018

(86) PCT No.: PCT/FR2018/052308
§ 371 (c)(1),
(2) Date: Mar. 26, 2020

(87) PCT Pub. No.: WO2019/063913
PCT Pub. Date: Apr. 4, 2019

(65) Prior Publication Data
US 2020/0231848 A1 Jul. 23, 2020

(30) Foreign Application Priority Data
Sep. 29, 2017 (FR) ...................................... 1759099

(51) Int. Cl.
*C09J 161/06* (2006.01)
*B60C 9/00* (2006.01)
*C09J 109/06* (2006.01)
*D07B 1/16* (2006.01)
*C09J 109/08* (2006.01)
*C09J 11/04* (2006.01)
*C08K 3/32* (2006.01)
*B60C 19/08* (2006.01)
*D07B 1/06* (2006.01)

(52) U.S. Cl.
CPC ........... *C09J 161/06* (2013.01); *B60C 9/0007* (2013.01); *B60C 19/08* (2013.01); *C09J 11/04* (2013.01); *C09J 109/06* (2013.01); *C09J 109/08* (2013.01); *D07B 1/0666* (2013.01); *D07B 1/16* (2013.01); *B60C 2009/0021* (2013.01); *C08K 2003/324* (2013.01)

(58) Field of Classification Search
CPC ........ C09J 161/04–14; C08L 61/04–14; C08K 2003/324
See application file for complete search history.

(56) References Cited

U.S. PATENT DOCUMENTS

| 4,115,227 | A | 9/1978 | Hazan |
| 4,236,564 | A * | 12/1980 | Kalafus ..................... C08J 5/06 |
| | | | 152/565 |
| 4,731,430 | A | 3/1988 | Kempter et al. |
| 7,250,463 | B2 | 7/2007 | Durel et al. |
| 7,820,771 | B2 | 10/2010 | Lapra et al. |
| 10,544,292 | B2 | 1/2020 | Doisneau et al. |
| 10,544,298 | B2 | 1/2020 | Doisneau et al. |
| 2003/0018117 | A1 | 1/2003 | Mowrey et al. |
| 2005/0004297 | A1 | 1/2005 | Durel et al. |
| 2008/0132644 | A1 | 6/2008 | Lapra et al. |
| 2009/0270558 | A1 | 10/2009 | Gandon-pain et al. |
| 2016/0251550 | A1 | 9/2016 | Michoud et al. |
| 2016/0376481 | A1 | 12/2016 | Fukuzawa et al. |
| 2017/0165942 | A1* | 6/2017 | Michoud ................. B32B 15/06 |
| 2017/0166010 | A1 | 6/2017 | Michoud et al. |
| 2017/0166011 | A1 | 6/2017 | Michoud et al. |
| 2017/0174006 | A1 | 6/2017 | Michoud et al. |
| 2017/0362370 | A1 | 12/2017 | Doisneau et al. |
| 2018/0118983 | A1 | 5/2018 | Doisneau et al. |
| 2018/0362754 | A1 | 12/2018 | Thuilliez et al. |
| 2019/0112512 | A1 | 4/2019 | Doisneau et al. |
| 2019/0119535 | A1 | 4/2019 | Doisneau |
| 2019/0145493 | A1 | 5/2019 | Doisneau et al. |
| 2020/0031980 | A1 | 1/2020 | Doisneau et al. |

(Continued)

FOREIGN PATENT DOCUMENTS

| CN | 105368355 A | 3/2016 |
| DE | 4434593 A1 | 4/1996 |
| EP | 0 209 023 A2 | 1/1987 |

(Continued)

OTHER PUBLICATIONS

Machine Translation of JPS57-115472A. Jul. 17, 1982 (Year: 1982).*
Kopf, P. W. Phenolic Resins. Encyclopedia of Polymer Science and Technology. pp. 322-368. Jul. 15, 2002. (Year: 2002).*
Sarika et al. Bio-Based Alternatives to Phenol and Formaldehyde for the Production of Resins. Polymers, 2020, 12, 2237. (Year: 2020).*
International Search Report dated Jan. 4, 2019, in corresponding PCT/FR2018/052308 (6 pages).
French Search Report dated Jun. 6, 2018, in corresponding FR application No. 1759099 (7 pages).
W. J. Van Ooij, "Mechanism and Theories of Rubber Adhesion to Steel Tire Cords—An Overview", Rubber Chemistry and Technology, vol. 57, pp. 421-456 (1984).

*Primary Examiner* — Stephen E Rieth
(74) *Attorney, Agent, or Firm* — Venable LLP

(57) ABSTRACT

The present invention relates to an adhesive composition comprising: at least one phosphate salt chosen from sodium phosphate, potassium phosphate and mixtures of these phosphates; and at least one resin based on: at least one compound A1, compound A1 being chosen from a compound A11 comprising at least two functions, one of these functions being a hydroxymethyl function and the other being an aldehyde function or a hydroxymethyl function, or a compound A12 comprising at least one aldehyde function, or a mixture of a compound A11 and of a compound A12; and at least one phenol A21.

12 Claims, 2 Drawing Sheets

(56) References Cited

U.S. PATENT DOCUMENTS

2020/0255966 A1  8/2020 Michoud et al.
2020/0269524 A1  8/2020 Doisneau

FOREIGN PATENT DOCUMENTS

| EP | 2006341 A2 | 12/2008 | |
|----|------------|---------|---|
| JP | 57115472 A * | 7/1982 | |
| JP | 2006-89545 A | 4/2006 | |
| JP | 2013-23633 A | 2/2013 | |
| JP | 2017-514010 A | 6/2017 | |
| WO | 97/36724 A2 | 10/1997 | |
| WO | 99/16600 A1 | 4/1999 | |
| WO | 03/016387 A1 | 2/2003 | |
| WO | 2006/069792 A1 | 7/2006 | |
| WO | 2006/069793 A1 | 7/2006 | |
| WO | 2015/007641 A1 | 1/2015 | |
| WO | WO-2015118040 A1 * | 8/2015 | ............. B32B 15/06 |

* cited by examiner

ADHESIVE COMPOSITION COMPRISING A PHOSPHATE SALT AND A THERMOSETTING RESIN

BACKGROUND

The field of the present invention is that of conductive elements and adhesive compositions or "glues" intended to make such conductive elements adhere to elastomeric matrices, such as those commonly used in semi-finished elastomer articles or products, or else in the field of tyres or belts.

The present invention more particularly relates to adhesive compositions based on at least one phosphate salt and a resin, to the use of this adhesive composition for the coating of conductive elements, to a process for coating these conductive elements, to an elastomeric composite reinforced with conductive elements coated with an adhesive layer based on said adhesive composition, and to tyres or belts reinforced with such elastomeric composites.

Steel wire elements for tyres comprising one or more steel wires are known in the prior art.

A first solution for making these steel wires adhere to elastomeric matrices is to use adhesives known under the name "RFL" (for resorcinol-formaldehyde latex), as described, for instance, in EP 2 006 341. These RFL adhesives comprise, in a well-known manner, a thermosetting phenolic resin, obtained by the condensation of resorcinol with formaldehyde, and one or more diene elastomeric latices in aqueous solution.

The RFL adhesives of EP 2 006 341 ensure good adhesion of the coated steel wire(s) to elastomeric matrices without these wires being surface-treated, that is to say in the absence of a layer of a metal coating, for example a layer of brass. However, the RFL adhesive requires the use of a halogenated polymer and of a metal oxide. In addition, this RFL adhesive requires the use of an elastomeric matrix comprising an acrylic rubber composition and thus does not allow satisfactory adhesion with just any elastomeric matrix.

A second solution for making these steel wires adhere to elastomeric matrices is to coat the steel wires with a layer of brass. This second solution is the most widespread and the most effective industrial solution. During the curing of the tyre, an adhesive interface is formed which comprises zinc oxide, zinc sulfide and copper sulfide resulting from the reaction between the brass and the elastomeric matrix. Such an interface and the corresponding physicochemical mechanisms are notably described in the article "Mechanism and theories of rubber adhesion to steel cords—An overview", W. J. Van Ooij, Rubber Chemistry and Technology, 421-456, Vol. 57.

However, it is necessary, notably for the formation of copper sulfide and zinc sulfide, to have available an elastomeric matrix based on an elastomeric composition comprising a crosslinking system comprising a high content of molecular sulfur of between 6 and 12 phr. However, such an elastomeric matrix has, due to the high content of molecular sulfur, a limited shelf life because of the risks of pre-vulcanization of the elastomeric composition at room temperature. Above all, such an adhesion interface involving copper and zinc sulfides degrades over time, which reduces the adhesion between the wires and the elastomeric matrix.

Thus, the designers of elastomeric articles, notably tyre manufacturers, have the objective today of finding novel simple adhesive systems which make it possible to make metal wire elements adhere durably to elastomeric matrices, without the latter necessarily being based on an acrylic rubber composition or without having to use the adhesive in combination with a halogenated polymer and a metal oxide.

It is desirable for this adhesion to be initially, i.e. after cooling following the curing, relatively high and for this adhesion to be durable, i.e. not be degraded significantly over time.

In the course of its research, the Applicant has discovered an adhesive composition which makes it possible to meet the above objective.

SUMMARY

One subject of the invention is thus an adhesive composition comprising:
  a phosphate salt chosen from sodium phosphate, potassium phosphate and mixtures of these phosphates, and
  at least one resin based on:
    at least one compound A1, compound A1 being chosen from:
      a compound A11 comprising at least two functions, one of these functions being a hydroxymethyl function and the other being an aldehyde function or a hydroxymethyl function, or
      a compound A12 comprising at least one aldehyde function, or
      a mixture of a compound A11 and of a compound A12, and
    at least one phenol A21.

The Applicant thus puts forward the hypothesis that the phosphate salt makes it possible to create a passivation layer at the surface of the conductive element, this passivation layer firstly allowing good initial adhesion between the conductive element and an elastomeric matrix and secondly making it possible to maintain a good level of adhesion over time, thus making the adhesion long-lasting, and this being achieved without, however, using a matrix of specific elastomer, of halogenated polymer and of metal oxide.

Furthermore, in addition to participating in the formation of the passivation layer, the phosphate salt has a buffer effect and makes it possible to stabilize the pH of the adhesive composition.

Another subject of the invention relates to a conductive element coated with an adhesive layer based on the adhesive composition as defined previously.

The term "conductive element" means that the element is electrically conductive. In a preferential embodiment, the conductive object may thus be metallic.

The invention also relates to the use of an adhesive composition as defined previously for coating a conductive element.

The invention also relates to a process for coating at least one conductive element, in which the conductive element(s) are coated with an adhesive layer based on an adhesive composition as defined previously.

The invention also relates to an elastomeric composite reinforced with at least one coated conductive element as defined previously, comprising an elastomeric matrix in which the coated conductive element is embedded.

The invention also relates to a tyre comprising a conductive element as defined previously or an elastomeric composite as defined previously.

The invention also relates to a belt comprising a conductive element as defined previously or an elastomeric composite as defined previously.

The adhesive composition according to the invention allows an appreciable increase in the service life of the composites according to the invention, and thus of the tyres or belts including them.

BRIEF DESCRIPTION OF THE FIGURES

The invention will be better understood on reading the following description, given solely by way of non-limiting example and with reference to the drawings, in which.

DETAILED DESCRIPTION

Figure 1:
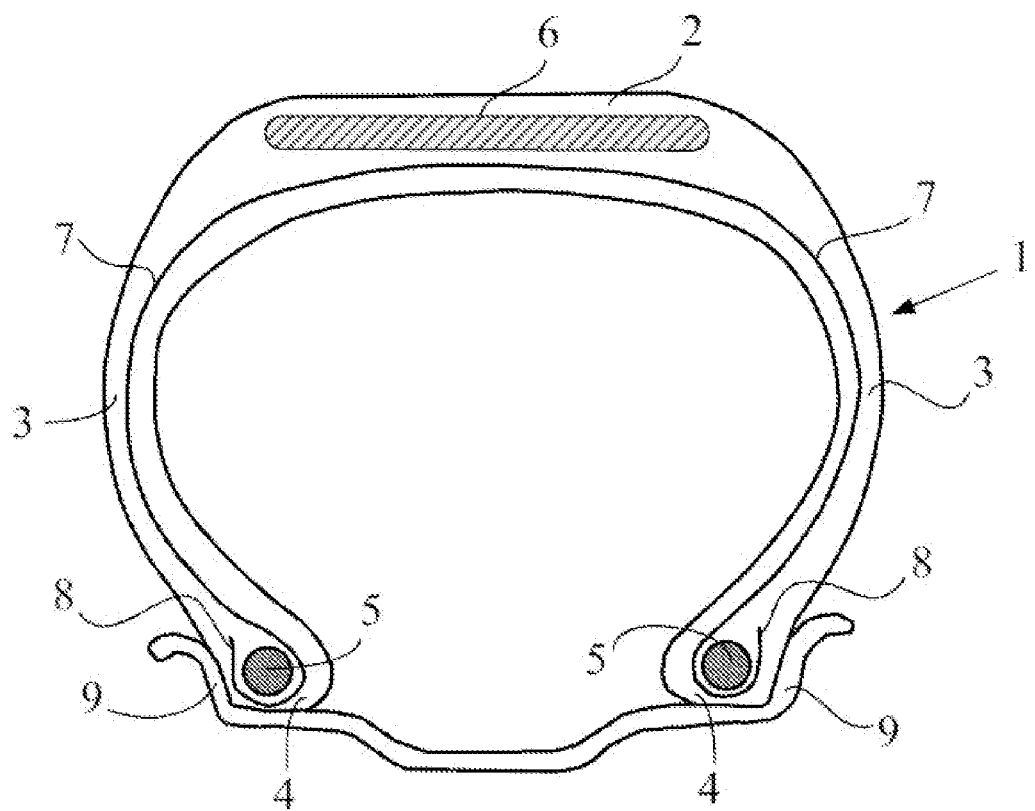
FIG. 1 is a diagram of a tyre according to the invention.

The term "layer directly coating an object" means that the layer is in contact with the object without any other object, notably another layer, being interposed between the two.

The term "phr" means parts by weight per hundred parts of elastomer.

Furthermore, any range of values denoted by the expression "between a and b" represents the range of values extending from more than "a" to less than "b" (i.e. limits a and b excluded), while any range of values denoted by the expression "from a to b" means the range of values extending from "a" up to "b" (i.e. including the strict limits a and b).

Within the context of the invention, the carbon-based products mentioned in the description may be of fossil or biosourced origin. In the latter case, they may partially or completely result from biomass or be obtained from renewable starting materials derived from biomass.

The invention and the advantages thereof will be readily understood in the light of the description and of the implementation examples that follow.

In the present description, unless expressly indicated otherwise, all the percentages (%) shown are mass percentages.

The term "elastomeric composition" means a composition comprising at least one elastomer (or, equally, rubber) and at least one other constituent.

The term "diene" elastomer (or, equally, rubber) means an elastomer resulting at least partly (i.e. a homopolymer or a copolymer) from diene monomer(s) (i.e., monomers bearing two conjugated or non-conjugated carbon-carbon double bonds).

The term "isoprene elastomer" means an isoprene homopolymer or copolymer, in other words a diene elastomer chosen from the group consisting of natural rubber (NR), synthetic polyisoprenes (IRs), various isoprene copolymers and mixtures of these elastomers.

The term "elastomeric matrix" means a matrix having elastomeric behaviour.

The term "meta position relative to each other" means that the hydroxyl functions are borne by carbons of the aromatic nucleus which are separated from each other by a single other carbon of the aromatic nucleus.

The term "in the position ortho to a function" means the position occupied by the carbon of the aromatic nucleus which is immediately adjacent to the carbon of the aromatic nucleus bearing the function.

The term "member" of a nucleus means a constituent atom of the backbone of the nucleus. Thus, for example, a benzene nucleus comprises six members, each member consisting of a carbon atom. In another example, a furan nucleus comprises five members, four members each consisting of a carbon atom and the remaining member consisting of an oxygen atom.

"CHO" represents the aldehyde function.

"CH2OH" represents the hydroxymethyl function.

The term "aromatic polyphenol" means an aromatic compound comprising at least one benzene nucleus bearing more than one hydroxyl function.

The term "resin based on" should be understood as meaning that the resin includes the mixture and/or product of reaction of the various base constituents used for this resin as is defined above and that this resin is solely based on the constituents based on the resin. Thus, the base constituents are the reagents intended to react together during the final condensation of the resin and are not reagents intended to react together to form these base constituents.

In accordance with the invention, the base constituents thus comprise at least one compound A1 and at least one phenol A21. In one embodiment, the base constituents can comprise other additional constituents different from compound A1 and from the phenol A21. In another embodiment, the base constituents are constituted of at least one compound A1 and of at least one phenol A21.

Preferably, in the embodiment in which the base constituents comprise other additional constituents, these other additional constituents are free of formaldehyde and/or free of methylene donor chosen from the group consisting of hexamethylenetetramine (HMT), hexamethoxymethylmelamine (H3M), hexaethoxymethylmelamine, lauryloxymethylpyridinium chloride, ethoxymethylpyridinium chloride, polymers of hexamethoxymethylmelamine of trioxane of formaldehyde, hexakis(methoxymethyl)melamine, N,N',N"-trimethyl-N,N',N"-trimethylolmelamine, hexamethylolmelamine, N-methylolmelamine, N,N'-dimethylolmelamine, N,N',N"-tris(methoxymethyl)melamine, N,N',N"-tributyl-N,N',N"-trimethylolmelamine. More advantageously, these other additional constituents are free of formaldehyde and free of the methylene donors described in this paragraph.

More preferably, in the embodiment in which the base constituents comprise other additional constituents, these other additional constituents are free of formaldehyde and/or free of methylene donor chosen from the group consisting of hexamethylenetetramine, hexaethoxymethylmelamine, hexamethoxymethylmelamine, lauryloxymethylpyridinium chloride, ethoxymethylpyridinium chloride, hexamethoxymethylmelamine of trioxane and the N-substituted oxymethylmelamines corresponding to the general formula:

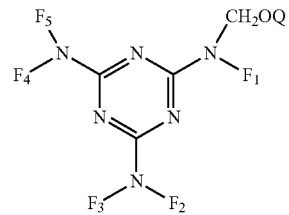

in which Q represents an alkyl group containing from 1 to 8 carbon atoms; $F_1$, $F_2$, $F_3$, $F_4$ and $F_5$ are chosen, independently of each other, from the group consisting of a hydrogen atom, of an alkyl group containing from 1 to 8 carbon atoms, of the group —CH2OQ and the condensation products thereof. More advantageously, these other additional constituents are free of formaldehyde and free of the methylene donors described in this paragraph.

Even more preferably, in the embodiment in which the base constituents comprise other additional constituents, these other additional constituents are free of formaldehyde and/or free of methylene donor. More advantageously, these other additional constituents are free of formaldehyde and free of methylene donors.

The term "free of formaldehyde or free of methylene donor" means that the total mass content of formaldehyde or of methylene donor(s) belonging to the groups described above, relative to the total weight of the compound(s) A1 in the base constituents is less than or equal to 10%, preferably less than or equal to 5%, more preferentially less than or equal to 2% and even more preferentially less than or equal to 1%.

The term "free of formaldehyde or free of methylene donor" means that the total mass content of formaldehyde and of methylene donor(s) belonging to the groups described above, relative to the total weight of the compound(s) A1 in the base constituents, is less than or equal to 10%, preferably less than or equal to 5%, more preferentially less than or equal to 2% and even more preferentially less than or equal to 1%.

The term "adhesive layer based on" should, of course, be understood as meaning an adhesive layer including the mixture and/or the product of reaction of the various base constituents used to form the adhesive layer, in this instance the base constituents of the adhesive composition, it being possible for some of them to be intended to react or being capable of reacting with each other or with their immediate chemical surroundings, at least partly, during the various phases of manufacture of the adhesive layer, of the metallic reinforcement element or of the finished articles or composites, in particular during a curing step.

The term "solids content of the adhesive composition or an adhesive compound" means the mass of the adhesive composition or compound in g obtained after drying to the mass in g of the adhesive composition before drying. The solids content is measured in accordance with the standard NF EN 827 (March 2006).

Adhesive Composition According to the Invention

The adhesive composition thus comprises at least one (i.e. one or more) phosphate salt and at least one (i.e. one or more) resin, this resin being based on at least one (i.e. one or more) compound A1, the compound A1 being chosen from:
- a compound A11 comprising at least two functions, one of these functions being a hydroxymethyl function and the other being an aldehyde function or a hydroxymethyl function, or
- a compound A12 comprising at least one aldehyde function, or
- a mixture of a compound A11 and of a compound A12; and at least one (i.e. one or more) phenol A21, which constituents will be described thereafter.

In one preferential embodiment, the adhesive composition thus comprises at least one (i.e. one or more) phosphate salt and at least one (i.e. one or more) resin; this resin being based on at least one (i.e. one or more) compound A11 and at least one (i.e. one or more) phenol A21.

In another preferential embodiment, the adhesive composition thus comprises at least one (i.e. one or more) phosphate salt and at least one (i.e. one or more) resin; this resin being based on at least one (i.e. one or more) compound A12 and at least one (i.e. one or more) phenol A21.

In yet another embodiment, the adhesive composition thus comprises at least one (i.e. one or more) phosphate salt and at least one (i.e. one or more) resin; this resin being based on at least one (i.e. one or more) compound A11 and at least one (i.e. one or more) compound A12 and at least one (i.e. one or more) phenol A21.

Very preferentially, the adhesive composition is aqueous. The term "aqueous" means that the water content of the adhesive composition is greater than or equal to 50% by weight. The use of water as solvent makes the adhesive composition readily usable under industrial conditions and at reduced cost.

Advantageously, the water content of the adhesive composition is between 70% and 95% by weight and preferably between 75% and 90% by weight.

The solids content of the adhesive composition is between 5% and 30% by weight and preferably between 10% and 25% by weight.

The adhesive composition advantageously has a solids content of thermosetting resin and of latex of between 5% and 60%, more preferentially between 10% and 30% by weight.

The term "solids content of the thermosetting resin and of latex" means the ratio between the mass of the thermosetting resin and of the latex obtained after drying the aqueous adhesive composition to the mass of the aqueous adhesive composition before drying.

The solids content of the elastomeric latex (latices) in the aqueous adhesive composition ranges from 3.0% to 29.0%, preferably from 11.0% to 24.0% and more preferentially from 13.0% to 21.0%.

The weight ratio of the solids content of resin to the solids content of latex is preferably between 0.1 and 2.0.

Advantageously, the pH of the adhesive composition is basic, i.e. strictly greater than 7, so as firstly to obtain phenoxides in aqueous solution and secondly to facilitate the stabilization of the latices.

Preferably, the pH ranges from 8 to 14 and more preferentially from 9 to 12. This pH is measured under standard conditions, namely 23° C.±2° C. at atmospheric pressure according to the AFNOR standard NF T 90-008: Water quality—determination of the pH. A Mettler-Toledo Inlab 413 electrode is immersed into the solution and the value displayed after 2 minutes is then recorded.

Preferably, the adhesive composition comprises anionic surfactants for stabilizing the adhesive composition.

Phosphate Salt

An essential constituent of the adhesive composition is a phosphate salt chosen from sodium phosphate, potassium phosphate and mixtures of these phosphates.

Sodium phosphate is the compound which, in solid form, has the formula $Na_3PO_4$ and potassium phosphate is the compound which, in solid form, has the formula $K_3PO_4$.

Advantageously, the phosphate salt is sodium phosphate.

The sodium and potassium phosphate salts have the advantage of being water-soluble under standard temperature and pressure conditions. Thus, these phosphate salts are soluble in the aqueous adhesive composition in a mass content of greater than or equal to 1 g/L in the aqueous adhesive composition, preferably 10 g/L. This solubility is measured under standard conditions, namely 23° C. at atmospheric pressure, by means of the following protocol. The aqueous adhesive composition comprising all of its constituents except for the phosphate salt(s) whose solubility it is desired to measure is prepared. Exactly approximately X g of solid to be measured are weighed out on a precision balance (0.0001 g). The solid is then placed in a conical flask and the aqueous adhesive composition prepared is gradually added to the conical flask with stirring. Once the solid is visibly dissolved, the final volume V of the aqueous adhesive composition prepared is measured. The ratio of the mass X to the volume V indicates the solubility.

Preferably, the composition is free of zinc phosphate dispersant and free of zinc phosphate.

More preferentially, the adhesive composition is free of agent for dispersing a water-insoluble phosphate salt and free of water-insoluble phosphate salts. In this more preferential embodiment, all the phosphate salts of the adhesive composition are water-soluble.

The term "agent for dispersing a salt in water" means a compound which has the property of keeping particles of this salt suspended in water and of ensuring the stability of the composition.

In a preferred embodiment, the adhesive composition does not comprise any phosphate salts other than the salts chosen from sodium phosphate, potassium phosphate and mixtures of these phosphates.

In a first embodiment in which the phosphate salt is sodium phosphate, the sodium phosphate is mixed so that the sodium phosphate solids content in the aqueous adhesive composition is less than or equal to 2.50%, preferably less than or equal to 2.00%, more preferentially less than or equal to 1.50% and even more preferentially less than or equal to 1.00%.

In this same first embodiment in which the phosphate salt is sodium phosphate, the sodium phosphate is mixed so that the sodium phosphate solids content in the aqueous adhesive composition is greater than or equal to 0.40%, preferably greater than or equal to 0.60%.

Very advantageously, the tribasic phosphate $Na_3PO_4$ has a buffer effect and makes it possible to maintain a pH ranging from 9 to 11.5. The tribasic phosphate $Na_3PO_4$ thus provides the adhesive composition with pH stability.

In a second embodiment in which the phosphate salt is potassium phosphate, the potassium phosphate is mixed so that the potassium phosphate solids content in the aqueous adhesive composition is less than or equal to 3.00%, preferably less than or equal to 2.50%, more preferentially less than or equal to 2.00% and even more preferentially less than or equal to 1.50%.

In this same second embodiment in which the phosphate salt is potassium phosphate, the potassium phosphate is mixed so that the potassium phosphate solids content in the aqueous adhesive composition is greater than or equal to 0.50%, preferably greater than or equal to 0.80%.

In a third embodiment in which the phosphate salt is a mixture of sodium phosphate and potassium phosphate, the sodium phosphate and potassium phosphate are mixed so that the potassium phosphate solids content in the aqueous adhesive composition is less than or equal to 3.00%, preferably less than or equal to 2.50%, very preferentially less than or equal to 2.00%, more preferentially less than or equal to 1.50% and even more preferentially less than or equal to 1.00%.

In this same third embodiment in which the phosphate salt is a mixture of sodium phosphate and potassium phosphate, the sodium phosphate and potassium phosphate are mixed so that the potassium phosphate solids content in the aqueous adhesive composition is greater than or equal to 0.40%, preferably greater than or equal to 0.50%, very preferentially greater than or equal to 0.60% and more preferentially greater than or equal to 0.80%.

Compound A1

Another essential constituent of the adhesive composition is a compound A1 chosen from:
- a compound A11 comprising at least two functions, one of these functions being a hydroxymethyl function and the other being an aldehyde function or a hydroxymethyl function, or
- a compound A12 comprising at least one aldehyde function, or
- a mixture of a compound A11 and of a compound A12. In accordance with the invention, the resin is based on at least one (i.e. one or more) compound A1.

In a first embodiment, compound A12 comprises at least one aromatic nucleus bearing at least one aldehyde function.

More preferentially, compound A12 bears at least two aldehyde functions.

Even more preferentially, the aromatic nucleus of compound A12 bears two aldehyde functions.

In one embodiment, the aromatic nucleus of compound A12 is chosen from the group consisting of a benzene nucleus and a furan nucleus; preferably, the aromatic nucleus of compound A12 is a benzene nucleus.

Preferably, compound A12 is chosen from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures of these compounds.

In one variant of the first embodiment, compound A12 has the general formula (A):

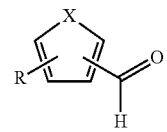

(A)

in which:
X comprises N, S or O,
R represents —H or —CHO.

Preferentially, compound A12 has the general formula (A'):

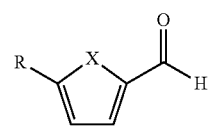

(A')

Even more preferentially, R represents —CHO.

According to a preferred embodiment, X represents O.

In one variant of compound A12 of general formula (A), X represents O and R represents —H. The compound A12 used is then of formula (Ba):

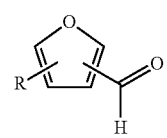

(Ba)

In a variant of the aldehyde of general formula (A'), X represents O and R represents —H. The compound A12 used is then furfuraldehyde and has the formula (B'a):

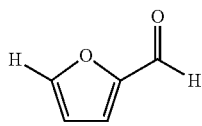
(B'a)

In another variant of compound A12 of general formula (A'), X represents O and R represents —CHO. The compound A12 used then has the formula (Bb):

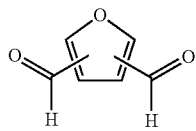
(Bb)

In another variant of compound A12 of general formula (A'), X represents O and R represents —CHO. The compound A12 used is then 2,5-furandicarboxaldehyde and has the formula (B'b):

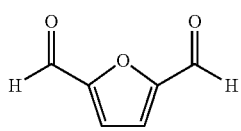
(B'b)

In another embodiment, X comprises N.
Preferably, compound A12 is chosen from the group consisting of furfuraldehyde, 2,5-furandicarboxaldehyde the mixtures of these compounds.
In one variant of compound A12 of general formula (A), X represents NH. The compound A12 used has the formula (Ca):

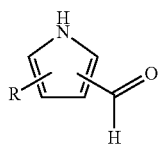
(Ca)

In one variant of compound A12 of general formula (A'), X represents NH. The compound A12 used has the formula (C'a):

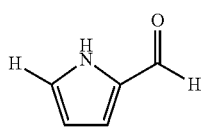
(C'a)

Preferably, R represents —CHO in the variant of compound A12 of formula (C'a) and the compound A12 obtained is then 1H-pyrrole-2,5-dicarboxaldehyde.
In another variant of compound A12 of general formula (A), X represents NT$_1$ with T$_1$ representing an alkyl, aryl, arylalkyl, alkylaryl or cycloalkyl group. The compound A12 used has the formula (Cb):

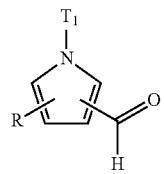
(Cb)

In another embodiment, X comprises S.
In one variant of compound A12 of general formula (A), X represents S. The compound A12 used has the formula (Da):

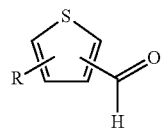
(Da)

In one variant of compound A12 of general formula (A'), X represents S. The compound A12 used has the formula (D'a):

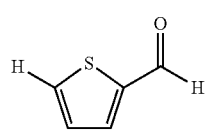
(D'a)

Preferably, R represents —CHO in the variant of compound A12 of formula (IV'a) and is then 2,5-thiophenedicarboxaldehyde.
In another variant of compound A12 of general formula (A), X represents ST$_2$ with T$_2$ representing an alkyl, aryl, arylalkyl, alkylaryl or cycloalkyl group. The compound A12 used has the formula (Db):

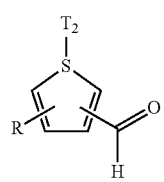
(Db)

In yet another variant of compound A12 of general formula (A), X represents T$_3$-S-T$_2$ with T$_2$ and T$_3$ each representing, independently of each other, an alkyl, aryl, arylalkyl, alkylaryl or cycloalkyl group. The compound A12 used has the formula (Dc):

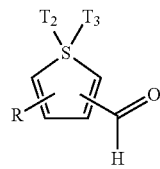
(Dc)

In yet another variant of compound A12 of general formula (A), X represents S═O. The compound A12 used has the formula (Dd):

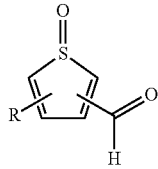
(Db)

In yet another variant of compound A12 of general formula (A), X represents O═S═O. The compound A12 used has the formula (De):

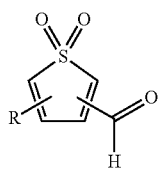
(De)

Among the various embodiments described above, preference will be given to the embodiments and variants in which X represents NH, S or O. In these embodiments and variants, it will be possible to have R representing —H or —CHO and preferably R representing —CHO. In these embodiments and variants, R will preferentially be in the 5 position and the —CHO group will preferentially be in the 2 position on the aromatic nucleus (general formula (A')).

In a second embodiment, compound A11 is an aromatic compound comprising at least one aromatic nucleus bearing at least two functions, one of these functions being a hydroxymethyl function and the other being an aldehyde function or a hydroxymethyl function.

Thus, in this second embodiment, it is said aromatic nucleus which bears hydroxymethyl and aldehyde functions. Compound A11 thus corresponds, in this second embodiment, to the general formula (I):

HO—CH$_2$—Ar—B   (I)

in which Ar represents an aromatic nucleus and B represents CHO or CH$_2$OH.

The aromatic nucleus is advantageously a 5- or 6-membered nucleus comprising, as members, carbon atoms and optionally one or more heteroatoms, in particular nitrogen, oxygen or sulfur atoms, optionally oxidized in the N-oxide or S-oxide form. In one variant, the aromatic nucleus comprises 0, 1 or 2 heteroatom(s). The remainder of the aromatic nucleus may be substituted or unsubstituted.

The aromatic nucleus may bear 0, 1 or 2 aldehyde functions, advantageously 0 or 1 aldehyde function.

The aromatic nucleus may bear 1, 2 or 3 hydroxymethyl functions, advantageously 1 or 2 hydroxymethyl functions.

In addition, the aromatic nucleus may also bear 0, 1 or 2 other function(s), in particular hydroxyl function(s).

In the embodiment in which the aromatic nucleus is a 6-membered nucleus, the B and hydroxymethyl functions are advantageously in the meta or para position relative to each other.

In the embodiment in which the aromatic nucleus is a 5-membered nucleus, the nucleus may comprise one or more heteroatoms, in particular nitrogen, oxygen or sulfur atoms, optionally oxidized in the N-oxide or S-oxide form. Advantageously, the aromatic nucleus comprises 1 or 2 heteroatom(s), preferably 1 heteroatom.

In this embodiment, in which the aromatic nucleus is a 5-membered nucleus, at least one of the following three conditions is met:
the aromatic nucleus comprises 0 or a single aldehyde function;
the aromatic nucleus comprises one or two hydroxymethyl functions;
apart from the aldehyde and hydroxymethyl functions, the remainder of the aromatic nucleus is unsubstituted.
Advantageously, these three conditions are met.
In a first case, the aromatic nucleus comprises:
a single aldehyde function;
a single hydroxymethyl function;
apart from the aldehyde and hydroxymethyl functions, the remainder of the aromatic nucleus is unsubstituted.
In a second case, the aromatic nucleus comprises:
0 aldehyde functions;
two hydroxymethyl functions;
apart from the hydroxymethyl functions, the remainder of the aromatic nucleus is unsubstituted.

Advantageously, compound A11 corresponds to the general formula (II):

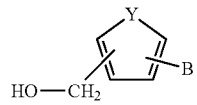
(II)

in which B represents CHO or CH$_2$OH, Y represents O, NR$_1$, NO, S, SO, SO$_2$ or SR$_2$R$_3$, R$^1$ represents a hydrogen or an alkyl, aryl, arylalkyl, alkylaryl or cycloalkyl group and R$^2$ and R$^3$ each represent, independently of each other, a hydrogen or an alkyl, aryl, arylalkyl, alkylaryl or cycloalkyl group.

Advantageously, compound A11 has the general formula (II'):

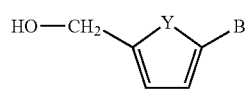
(II')

in which Y and B are as defined previously.

In a particularly advantageous embodiment, B represents CHO. In another embodiment, B represents CH$_2$OH.

According to a preferential embodiment, Y represents O.
In one variant, compound A11 has the formula (IIa):

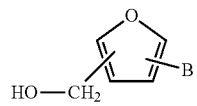
(IIa)

B being as defined previously.
More particularly, compound A11 corresponds to the general formula (II'a1) or (II'a2):

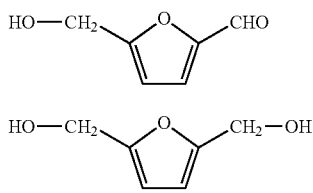
(II'a1)

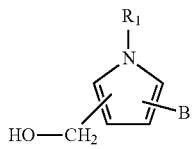
(II'a2)

5-(Hydroxymethyl)furfural (II'a1) is a particularly suitable compound A11, given that this organic compound can be readily derived from renewable resources. Specifically, it is derived notably from the dehydration of certain sugars, such as fructose, glucose, sucrose, cellulose and insulin.

In another embodiment, Y represents $NR_1$ or NO, advantageously $NR_1$. $R_1$ represents a hydrogen or an alkyl, aryl, arylalkyl, alkylaryl or cycloalkyl group.

In one variant, the compound is of formula (IIb):

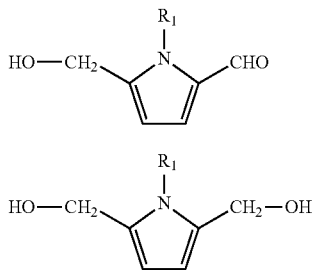
(IIb)

B being as defined previously,
and more particularly of formula (II'b1) or (II'b2):

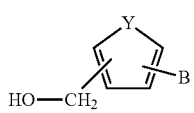
(II'b1)

(II'b2)

in which $R_1$ is as defined previously. Advantageously, $R_1$ represents a hydrogen or a $C_1$-$C_6$ alkyl group.

In another embodiment, Y represents S, SO, $SO_2$ or $SR_2R_3$ with $R_2$ and $R_3$ as defined previously.

In one variant, the compound is of formula (IIc):
B being as defined previously, (IIc)

with Y represents S, $SR_2R_3$, SO or $SO_2$ and $R_2$ and $R_3$ each represent, independently of each other, a hydrogen or an alkyl, aryl, arylalkyl, alkylaryl or cycloalkyl group, B, $R_2$ and $R_3$ being as being as defined previously;

and more particularly of formula (II'c1) or (II'c2):

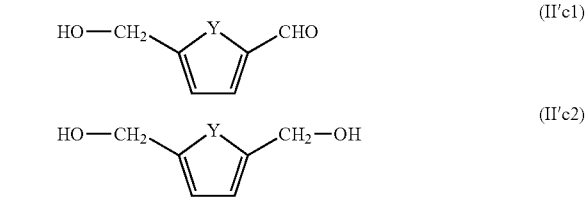
(II'c1)

(II'c2)

in which Y represents S, $SR_2R_3$, SO or $SO_2$ and $R_2$ and $R_3$ each represent, independently of each other, a hydrogen or an alkyl, aryl, arylalkyl, alkylaryl or cycloalkyl group.

The compound may thus be:

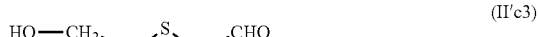
(II'c3)

(II'c4)

(II'c5)

(II'c6)

(II'c7)

(II'c8)

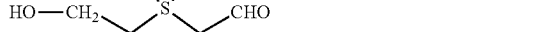
(II'c9)

(II'c10)

Advantageously, $R_2$ and $R_3$ each represent, independently of each other, a $C_1$-$C_6$ alkyl radical.

The compound is advantageously of formula (II'c3) or (II'c4).

In another variant, the aromatic nucleus is a 6-membered nucleus, which may comprise 0, one or more heteroatoms, in particular nitrogen, optionally oxidized in N-oxide form. In one variant, the aromatic nucleus comprises 0, 1 or 2 heteroatom(s).

The B and hydroxymethyl functions are advantageously in the meta or para position relative to each other.

The aromatic nucleus may bear 0, 1 or 2 aldehyde functions, advantageously 0 or 1 aldehyde function.

The aromatic nucleus may bear 1, 2 or 3 hydroxymethyl functions, advantageously 1 or 2 hydroxymethyl functions.

In addition, the aromatic nucleus may also bear 0, 1 or 2 other function(s), in particular hydroxyl function(s).

Advantageously, compound A11 has the general formula (III):

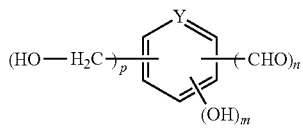

(III)

in which Y represents C or $NR_1$, n has the value 0, 1 or 2, m has the value 0 or 1 and p has the value 1, 2 or 3. $R_1$ represents a hydrogen or an alkyl, aryl, arylalkyl, alkylaryl or cycloalkyl group. Thus, p+n≥1 with p>0.

Advantageously, $R_1$ represents a hydrogen or a $C_1$-$C_6$ alkyl group.

In one variant, n has the value 1, m has the value 0 and p has the value 1.

In another variant, n has the value 1, m has the value 1 and p has the value 1.

In another variant, n has the value 2, m has the value 1 and p has the value 1.

In another variant, n has the value 1, m has the value 1 and p has the value 2.

In another variant, n has the value 0, m has the value 0 and p has the value 2.

In another variant, n has the value 0, m has the value 1 and p has the value 2.

In another variant, n has the value 1, m has the value 1 and p has the value 2.

In another variant, n has the value 0, m has the value 1 and p has the value 3.

Preferentially, the aromatic nucleus of compound A11 is a benzene nucleus. More preferentially, this aldehyde is chosen from the group consisting of 2-hydroxymethylbenzene-1-carboxaldehyde, 3-hydroxymethylbenzene-1-carboxaldehyde, 4-hydroxymethylbenzene-1-carboxaldehyde, 3-hydroxymethyl-6-hydroxybenzene-1-carboxaldehyde, 3-hydroxymethyl-4-hydroxybenzene-1-carboxaldehyde, 3-hydroxymethyl-2-hydroxybenzene-1-carboxaldehyde, 3-hydroxymethyl-2-hydroxybenzene-1,5-dicarboxaldehyde, 5-hydroxymethyl-2-hydroxybenzene-1,3-dicarboxaldehyde, 3,5-hydroxymethyl-4-hydroxybenzene-1-carboxaldehyde, 3,5-hydroxymethyl-2-hydroxybenzene-1-carboxaldehyde, 1,2-hydroxymethylbenzene, 1,3-hydroxymethylbenzene, 1,4-hydroxymethylbenzene, 1,3-hydroxymethyl-6-hydroxybenzene, 1,3-hydroxymethyl-4-hydroxybenzene, 1,3-hydroxymethyl-2-hydroxybenzene, 1,3,5-hydroxymethyl-2-hydroxybenzene, 1,3-hydroxymethyl-6-hydroxybenzene, 1,3,5-hydroxymethyl-4-hydroxybenzene, 1,3,2-hydroxymethyl-2-hydroxybenzene and mixtures of these compounds.

Even more preferentially, compound A11 used is 1-hydroxymethylbenzene-4-carboxaldehyde of formula (IIIa) or 1,4-hydroxymethylbenzene of formula (IIIb):

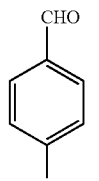

(IIIa)

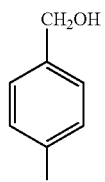

(IIIb)

Among the other advantages associated with the use of the compounds A11 and/or A12, it will be noted that the adhesive composition may be free of formaldehyde, the use of which it is desirable to reduce, indeed even to eliminate in the long run, in adhesive compositions, due to the recent change in European regulations regarding this type of compound. In addition, formaldehyde is a compound derived from oil, the use of which it is desired to avoid as much as possible for reasons of increased scarcity.

Phenol A21

In accordance with the invention, the resin is based on at least one (i.e. one or more) phenol A21.

Advantageously, the phenol A21 is chosen from:
  an aromatic polyphenol A2 comprising at least one aromatic nucleus bearing at least two hydroxyl functions in the meta position relative to each other, the two positions ortho to at least one of the hydroxyl functions being unsubstituted,
  an aromatic monophenol A2' comprising at least one six-membered aromatic nucleus bearing a single hydroxyl function,
    the two positions ortho to the hydroxyl function being unsubstituted, or
    at least one position ortho to and the position para to the hydroxyl function being unsubstituted,
  a mixture of A2 and AZ.

In one embodiment, the phenol is an aromatic polyphenol A2 including one or more aromatic nuclei. The aromatic polyphenol comprises at least one aromatic nucleus bearing at least two hydroxyl functions in the meta position relative to each other, the two positions ortho to at least one of the hydroxyl functions being unsubstituted.

In another embodiment, the phenol is an aromatic monophenol A2' comprising at least one six-membered aromatic nucleus bearing a single hydroxyl function. On this aromatic monophenol, the two positions ortho to the hydroxyl function are unsubstituted, or else at least one position ortho to and the position para to the hydroxyl function are unsubstituted.

In yet another embodiment, the phenol is a mixture of the aromatic polyphenol A2 and of the aromatic monophenol A2' as described above.

In accordance with the invention, the aromatic polyphenol A2 may be, in one embodiment, a simple aromatic polyphenol molecule comprising one or more aromatic nuclei, at least one of these aromatic nuclei, or even each aromatic nucleus, bearing at least two hydroxyl functions in the meta position relative to each other, the two positions ortho to at least one of the hydroxyl functions being unsubstituted.

Similarly, the aromatic monophenol A2' may be, in one embodiment, a simple aromatic monophenol molecule comprising one or more six-membered aromatic nuclei, at least one of these six-membered aromatic nuclei, or even each six-membered aromatic nucleus, bearing a single hydroxyl function, the two positions ortho to the hydroxyl function are unsubstituted, or else at least one position ortho to and the position para to the hydroxyl function are unsubstituted.

Such simple molecules do not comprise any repeating units.

In accordance with the invention, the aromatic polyphenol A2 may be, in another embodiment, a precondensed resin based on:
- at least one aromatic polyphenol comprising at least one aromatic nucleus bearing at least two hydroxyl functions in the meta position relative to each other, the two positions ortho to at least one of the hydroxyl functions being unsubstituted; and
- at least one compound comprising at least one aldehyde function and/or at least one compound comprising at least two hydroxymethyl functions borne by an aromatic nucleus.

Such a precondensed resin based on aromatic polyphenol is in accordance with the invention and comprises, unlike the simple molecule described above, a repeating unit. In the case in point, the repeating unit comprises at least one aromatic nucleus bearing at least two hydroxyl functions in the meta position relative to each other.

Similarly and in accordance with the invention, the aromatic monophenol AZ may be, in another embodiment, a precondensed resin based on:
- at least one aromatic monophenol comprising at least one six-membered aromatic nucleus bearing a single hydroxyl function:
  - the two positions ortho to the hydroxyl function are unsubstituted, or
  - at least one position ortho to and the position para to the hydroxyl function are unsubstituted;
- at least one compound comprising at least one aldehyde function and/or at least one compound comprising at least two hydroxymethyl functions borne by an aromatic nucleus.

Such a precondensed resin based on aromatic monophenol is in accordance with the invention and comprises, unlike the simple molecule described above, a repeating unit. In the case in point, the repeating unit comprises at least one six-membered aromatic nucleus bearing a single hydroxyl function.

In another embodiment, the phenol A21 is a mixture of an aromatic polyphenol which forms a simple molecule and of a precondensed resin based on aromatic polyphenol.

In yet another embodiment, the phenol A21 is a mixture of an aromatic monophenol which forms a simple molecule and of a precondensed resin based on aromatic monophenol.

In the specific embodiments which follow, the aromatic nucleus or nuclei of the aromatic polyphenol and/or of the aromatic monophenol are described. For the sake of clarity, the "aromatic polyphenol" and/or the "aromatic monophenol" is described therein in its simple molecule form. This aromatic polyphenol and/or this aromatic monophenol will subsequently be able to be condensed and will in part define the repeating unit. The features of the precondensed resin are described in more detail hereinbelow.

Aromatic Polyphenol A2

In a preferred embodiment, the aromatic nucleus of the aromatic polyphenol bears three hydroxyl functions in the meta position relative to each other.

Preferably, the two positions ortho to each hydroxyl function are unsubstituted. This is understood to mean that the two carbon atoms located on either side of (in the position ortho to) the hydroxylated carbon atom (i.e. the carbon atom bearing the hydroxyl function) bear a simple hydrogen atom.

Even more preferably, the remainder of the aromatic nucleus of the aromatic polyphenol is unsubstituted. This is understood to mean that the other carbon atoms of the remainder of the aromatic nucleus (those other than the carbon atoms bearing the hydroxyl functions) bear a simple hydrogen atom.

In one embodiment, the aromatic polyphenol comprises several aromatic nuclei, at least two of them each bearing at least two hydroxyl functions in the meta position relative to each other, the two positions ortho to at least one of the hydroxyl functions of at least one aromatic nucleus being unsubstituted.

In a preferred embodiment, at least one of the aromatic nuclei of the aromatic polyphenol bears three hydroxyl functions in the meta position relative to each other.

Preferably, the two positions ortho to each hydroxyl function of at least one aromatic nucleus are unsubstituted.

Even more preferably, the two positions ortho to each hydroxyl function of each aromatic nucleus are unsubstituted.

Advantageously, the, or each, aromatic nucleus of the aromatic polyphenol is a benzene nucleus.

As examples of aromatic polyphenols including just one aromatic nucleus, mention may be made in particular of resorcinol and phloroglucinol, as a reminder of structural formulae (IV) and (V), respectively:

(IV)

(V)

By way of example, in the case where the aromatic polyphenol includes several aromatic nuclei, at least two of these aromatic nuclei, which may be identical or different, are chosen from those of general formulae:

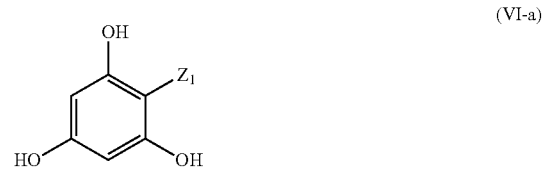

(VI-a)

-continued

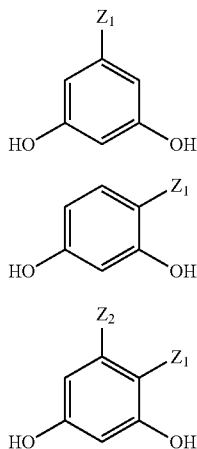

(VI-b)

(VI-c)

(VI-d)

in which the symbols $Z_1$ and $Z_2$, which may be identical or different, if there are several of them on the same aromatic nucleus, represent an atom (for example, carbon, sulfur or oxygen) or a bonding group, by definition at least divalent, which connects at least these two aromatic nuclei to the remainder of the aromatic polyphenol.

Another example of an aromatic polyphenol is 2,2',4,4'-tetrahydroxydiphenyl sulfide of structural formula (VII) below:

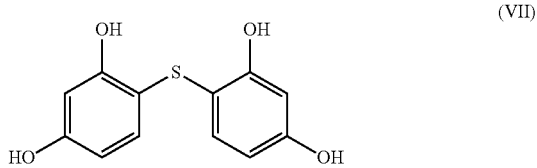 [SMILES: Oc1ccc(Sc2ccc(O)cc2O)c(O)c1]

(VII)

Another example of an aromatic polyphenol is 2,2',4,4'-tetrahydroxydiphenyl benzophenone of structural formula (VIII) below:

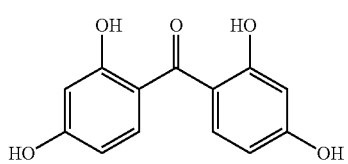

(VIII)

It is noted that each compound VII and VIII is an aromatic polyphenol including two aromatic nuclei (of formulae VI-c), each of which bears at least two (in this instance two) hydroxyl functions in the meta position relative to each other.

It is noted, in the case of an aromatic polyphenol including at least one aromatic nucleus in accordance with formula VI-b, that the two positions ortho to each hydroxyl function of at least one aromatic nucleus are unsubstituted. In the case of an aromatic polyphenol including several aromatic nuclei in accordance with formula VI-b, the two positions ortho to each hydroxyl function of each aromatic nucleus are unsubstituted.

According to one embodiment of the invention, the aromatic polyphenol is chosen from the group consisting of resorcinol (IV), phloroglucinol (V), 2,2',4,4'-tetrahydroxydiphenyl sulfide (VII), 2,2',4,4'-tetrahydroxybenzophenone (VIII) and mixtures of these compounds. In a particularly advantageous embodiment, the aromatic polyphenol is phloroglucinol.

In one embodiment, the aromatic polyphenol A2 comprises a precondensed resin based on the aromatic polyphenol as described in any one of these embodiments.

This precondensed resin is advantageously based on:
- at least one aromatic polyphenol as defined previously, and preferably chosen from the group consisting of resorcinol, phloroglucinol, 2,2',4,4'-tetrahydroxydiphenyl sulfide, 2,2',4,4'-tetrahydroxybenzophenone and mixtures thereof; and
- at least one compound capable of reacting with the aromatic polyphenol comprising at least one aldehyde function and/or at least one compound capable of reacting with the aromatic polyphenol comprising at least two hydroxymethyl functions, and preferentially an aromatic aldehyde comprising at least one aromatic nucleus bearing at least one aldehyde function.

The compound that is capable of reacting with the aromatic polyphenol may be a compound A1 as defined previously or any other aldehyde. Advantageously, said compound is chosen from the group consisting of an aromatic compound comprising an aromatic nucleus bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and mixtures of these compounds. Very advantageously, when the compound that is capable of reacting with the aromatic polyphenol is an aromatic compound comprising an aromatic nucleus bearing at least two functions, one of these functions being a hydroxymethyl function and the other being an aldehyde function or a hydroxymethyl function, this compound is chosen from the group consisting of 5-(hydroxymethyl)furfural, 2,5-di(hydroxymethyl)furan and mixtures of these compounds.

Thus, in the precondensed resin based on aromatic polyphenol, the repeating unit corresponds to the features of the aromatic polyphenol defined previously except that at least one of the carbon atoms of the aromatic nucleus, which was unsubstituted, is connected to another unit.

Irrespective of the compound other than the aromatic polyphenol which is the basis of the precondensed resin, this precondensed resin is devoid of free formaldehyde. This is because, even in the case where the precondensed resin is based on an aromatic polyphenol as described previously and on formaldehyde, since the formaldehyde has already reacted with the aromatic polyphenol, the precondensed resin is devoid of free formaldehyde liable to be able to react with a compound A1 in accordance with the invention in a subsequent step.

The aromatic polyphenol A2 may also comprise a mixture of a free aromatic polyphenol molecule and of a precondensed resin based on aromatic polyphenol, as described previously. In particular, the aromatic polyphenol A2 may also comprise a mixture of phloroglucinol and of a precondensed resin based on phloroglucinol.

Aromatic Monophenol A2'

The aromatic monophenol A2' may be in accordance with two variants. In one variant, the two positions ortho to the hydroxyl function are unsubstituted. In another variant, at least one position ortho to and the position para to the hydroxyl function are unsubstituted.

Advantageously, in the variant in which at least one position ortho to and the position para to the hydroxyl function are unsubstituted, a single ortho position is unsubstituted and the position para to the hydroxyl function is unsubstituted.

Preferably, whatever the variant, the two positions ortho to the hydroxyl function are unsubstituted. This is understood to mean that the two carbon atoms located on either side of (in the position ortho to) the hydroxylated carbon atom (i.e. the carbon atom bearing the hydroxyl function) bear a simple hydrogen atom.

Even more preferentially, the remainder of the aromatic nucleus is unsubstituted. This is understood to mean that the other carbon atoms of the remainder of the aromatic nucleus (those other than the carbon atoms bearing the hydroxyl functions) bear a simple hydrogen atom.

In one embodiment, the aromatic monophenol comprises several six-membered aromatic nuclei, at least two of them each bearing a single hydroxyl function and, for at least one of the hydroxyl functions, the two positions ortho to the hydroxyl function are unsubstituted or at least one position ortho to and the position para to the hydroxyl function are unsubstituted.

Preferably, the two positions ortho to each hydroxyl function of at least one six-membered aromatic nucleus are unsubstituted.

Even more preferentially, the two positions ortho to each hydroxyl function of each six-membered aromatic nucleus are unsubstituted.

Even more preferentially, the remainder of each of the aromatic nuclei is unsubstituted. This is understood to mean that the other carbon atoms of the remainder of each aromatic nucleus (those other than the carbon atoms bearing the hydroxyl functions or bearing the group which connects the aromatic nuclei together) bear a simple hydrogen atom.

Advantageously, the or each aromatic nucleus of the aromatic monophenol is a benzene nucleus.

Preferably, the aromatic monophenol is chosen from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid and mixtures of these compounds.

In one embodiment, the aromatic monophenol A2' comprises a precondensed resin based on the aromatic monophenol as described in any one of these embodiments.

This precondensed resin is advantageously based on:
- at least one aromatic monophenol as defined previously, and preferentially chosen from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid, and mixtures of these compounds; and
- at least one compound that is capable of reacting with the aromatic monophenol comprising at least one aldehyde function and/or at least one compound that is capable of reacting with the aromatic monophenol comprising at least two hydroxymethyl functions, and preferentially an aromatic aldehyde comprising at least one aromatic nucleus bearing at least one aldehyde function.

The compound that is capable of reacting with the aromatic monophenol may be a compound A1 as defined previously or any other aldehyde. Advantageously, said compound that is capable of reacting with the aromatic polyphenol is chosen from the group consisting of an aromatic compound comprising an aromatic nucleus bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and mixtures of these compounds. Very advantageously, when the compound is an aromatic compound comprising an aromatic nucleus bearing at least two functions, one of these functions being a hydroxymethyl function and the other being an aldehyde function or a hydroxymethyl function, this compound is chosen from the group consisting of 5-(hydroxymethyl)furfural, 2,5-di(hydroxymethyl)furan and mixtures of these compounds.

Thus, in the precondensed resin based on aromatic monophenol, the repeating unit corresponds to the features of the aromatic monophenol defined above except that at least one of the carbon atoms of the six-membered aromatic nucleus, which was unsubstituted, is connected to another unit.

Whatever the compound other than the aromatic monophenol that is the basis of the precondensed resin, this precondensed resin is devoid of free formaldehyde. This is because, even in the case where the precondensed resin is based on an aromatic monophenol as described previously and on formaldehyde, since the formaldehyde has already reacted with the aromatic monophenol, the precondensed resin is devoid of free formaldehyde liable to be able to react with a compound A1 in accordance with the invention in a subsequent step.

The aromatic monophenol A2' may also comprise a mixture of a free aromatic monophenol molecule and of a precondensed resin based on aromatic monophenol, as described previously. In particular, the aromatic monophenol A2' may also comprise a mixture of phenol and of a precondensed resin based on phenol.

Mixture of Aromatic Polyphenol A2 and of Aromatic Monophenol AZ

The phenol A21 may also comprise a mixture of an aromatic polyphenol A2 and of an aromatic monophenol AZ, as described previously.

Preferably, the phenol A21 comprises a mixture of an aromatic polyphenol and of a precondensed resin based on aromatic polyphenol.

Elastomeric Latex

The adhesive composition may optionally comprise a latex of at least one elastomer, which is preferably unsaturated. Such an elastomeric latex makes it possible to provide an elastomeric physical interface when the adhesive composition is used for coating elements intended to be embedded in an elastomeric matrix. When the elastomeric latex is unsaturated, it also provides a chemical interface by means of the unsaturations capable of forming bridges with the crosslinking system of the elastomeric matrix.

It is recalled that a latex is a stable dispersion of microparticles of elastomer(s) in suspension in a generally aqueous solution. An elastomeric latex is thus a composition in a liquid state comprising a liquid solvent, generally water, and at least one elastomer or a rubber dispersed in the liquid solvent so as to form a suspension. Thus, the latex is not a rubber composition which comprises a matrix of elastomer or of rubber in which at least one other component is dispersed. A rubber composition is in a plastic state in the uncured (non-crosslinked) state and in an elastic state in the cured (crosslinked) state, but never in a liquid state, unlike a latex.

Unsaturated (that is to say, bearing carbon-carbon double bonds) elastomer latices, notably diene elastomer latices, are well known to those skilled in the art. They notably form the elastomeric base of the RFL adhesives described in the introduction to the present specification.

The unsaturated elastomer of the latex is preferentially a diene elastomer, more preferentially a diene elastomer chosen from the group consisting of polybutadienes, butadiene copolymers, polyisoprenes, isoprene copolymers and mixtures of these elastomers.

It is more preferentially chosen from the group consisting of butadiene copolymers, vinylpyridine-styrene-butadiene terpolymers, natural rubber and mixtures of these elastomers.

It is even more preferentially chosen from the group consisting of butadiene copolymers, vinylpyridine-styrene-butadiene terpolymers, natural rubber with the exception of chlorinated natural rubber, and mixtures of these elastomers.

Process for Manufacturing a Precondensed Resin

N1 is defined as the number of reactive sites on the aromatic compound, as follows: an aldehyde function represents two reactive sites and a hydroxymethyl function represents one reactive site. Thus, for example, 5-(hydroxymethyl)furfural has N1=3 reactive sites and 2,5-di(hydroxymethyl)furan has N1=2 reactive sites.

In the case of an aromatic polyphenol, N2 is defined as the number of reactive sites of the aromatic polyphenol, as follows: each free carbon on the aromatic nucleus adjacent to a hydroxyl function borne by the aromatic nucleus represents a reactive site, each free carbon only being able to be counted as a reactive site for a single adjacent hydroxyl function. Thus, for example, resorcinol and phloroglucinol each have N2=3 reactive sites and 2,2',4,4'-tetrahydroxydiphenyl sulfide has N2=4 reactive sites.

In the case of an aromatic monophenol, N'2 is defined as the number of reactive sites of the aromatic monophenol, as follows: each free carbon on the six-membered aromatic nucleus adjacent to the hydroxyl function borne by the aromatic nucleus represents a reactive site, and the free carbon of the six-membered aromatic nucleus positioned para to the hydroxyl function represents a reactive site. Thus, for example, phenol has N'2=3 reactive sites.

The precondensed resin is obtained by mixing:
compound A1 and
the aromatic polyphenol A2 and optionally
the aromatic monophenol A2',
in a basic solvent preferably having a pH of between 8 and 13, more preferentially between 9 and 12, or in an acidic or neutral solvent preferably having a pH of between 4 and 7 and more preferentially between 5 and 7.

The precondensed resin is advantageously prepared by gradually mixing the aromatic polyphenol and optionally the aromatic monophenol and compound A1 in an aqueous solution.

In a first variant, the components on which the precondensed resin is based are mixed in a basic solvent, such as an aqueous sodium hydroxide solution, preferably having a pH of between 8 and 13, more preferentially between 9 and 12.

In a second variant, the components on which the precondensed resin is based are mixed in an acidic or neutral solvent such as an aqueous solution having a pH of between 4 and 7, preferably between 5 and 7.

In some cases, for example at relatively high concentrations or in the case of an acidic solvent, a person skilled in the art may find cause to add a thickener, for example carboxymethylcellulose, or a gelling agent, for example a gelatin, in order to limit the sedimentation of the precondensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

In the first variant, an acid is advantageously subsequently added so as to neutralize the base and to obtain a precondensed resin that can be stored and used subsequently.

In the second variant, a base is advantageously subsequently added so as to neutralize the acid and to obtain a precondensed resin that can be stored and used subsequently.

In order to prepare the precondensed resin, the molar amount n2 of aromatic polyphenol A2, the molar amount n'2 of aromatic monophenol AZ and the molar amount n1 of compound A1 are such that $[(n2*N2)+(n'2N'2)]/(n1*N1) > 1$, preferably $1 < [(n2*N2)+(n'2N'2))+(n'2N'2)]/(n1*N1) < 5$.

The precondensed resin is subsequently generally diluted in water.

In the final aqueous adhesive solution thus prepared, the solids content of precondensed resin according to the invention preferably represents between 2% and 30% by weight, more preferentially between 5% and 15% by weight.

The water content of the final aqueous adhesive solution thus prepared is preferably between 70% and 98% by weight, more preferentially between 85% and 95% by weight.

The term "water content of the aqueous adhesive solution" means the weight of water relative to the total weight of the adhesive solution.

Composition Manufacturing Process

The aqueous adhesive composition in accordance with the invention may of course comprise all or some of the additives customary for aqueous adhesive compositions, such as those used in conventional RFL adhesives; mention will be made, for example, of bases such as aqueous ammonia, sodium, potassium or ammonium hydroxide, dyes, fillers such as carbon black or silica, antioxidants or other stabilizers, and thickeners, for example carboxymethylcellulose, or gelling agents, for example a gelatin, making it possible to increase the viscosity of the composition. Mention will also be made of additives that make it possible to modify the setting or gelling time and the open time of the resin. As is known to those skilled in the art, the setting or gelling time is the length of time for which it is possible to apply the resin to its substrate and the open time is the length of time for which, after application of the resin to its substrate, it is possible to leave the resin in the open air without adversely affecting the quality of the subsequent adhesive bond with the complementary substrate. The setting time or gelling time and the open time are notably dependent on the temperature, pressure or else the resin concentration.

Typically, during a first resinification step, the constituents of the thermosetting resin itself are mixed, advantageously in water.

This first resinification step may be performed according to several embodiments.

Before describing in detail the various embodiments, it will first be specified that the thermosetting resin of the aqueous adhesive composition may be obtained by mixing the constituents of the resin, i.e. said compound A1 as defined previously, said aromatic compound A2 as defined previously and/or said aromatic compound A2' as defined previously, in a basic solvent, preferably having a pH of between 8 and 13, more preferentially between 9 and 12.

In a first embodiment, use is made of a precondensed resin based on aromatic polyphenol A2 as defined previously, i.e. a resin based on:
- at least one aromatic polyphenol comprising at least one aromatic nucleus bearing at least two hydroxyl functions in the meta position relative to each other, the two positions ortho to at least one of the hydroxyl functions being unsubstituted; and
- at least one compound that is capable of reacting with said aromatic polyphenol comprising at least one aldehyde function and/or at least one compound that is capable of reacting with said aromatic polyphenol comprising at least two hydroxymethyl functions borne by an aromatic nucleus.

The precondensed resin based on aromatic polyphenol A2 is advantageously prepared by gradually mixing the aromatic polyphenol and the compound comprising at least one aldehyde function and/or the compound comprising at least two hydroxymethyl functions borne by an aromatic nucleus, for example formaldehyde, in molar amounts as described previously.

In one variant, the components on which the precondensed resin is based are mixed in a basic solvent, such as an aqueous sodium hydroxide solution, preferably having a pH of between 8 and 13, more preferentially between 9 and 12.

Thus, the precondensed resin is obtained by mixing:
said aromatic polyphenol, and
said compound that is capable of reacting with said aromatic polyphenol, in a basic solvent preferably having a pH of between 8 and 13 and more preferentially between 9 and 12.

In some cases, for example at relatively high concentrations or in the case of an acidic solvent, a person skilled in the art may find cause to add a thickener, for example carboxymethylcellulose, or a gelling agent, for example a gelatin, in order to limit the sedimentation of the precondensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

As described previously, it is advantageously possible to neutralize the medium so as to obtain a precondensed resin that can be stored and used subsequently.

Then, in this first embodiment, the adhesive composition may be obtained by mixing:
this precondensed resin (compound A2), and
compound A1,
in a basic solvent preferably having a pH of between 8 and 13 and more preferentially between 9 and 12.

In particular, this precondensed resin based on aromatic polyphenol (compound A2) and compound A1 are gradually mixed in a basic solvent, such as an aqueous sodium hydroxide solution, preferably having a pH of between 8 and 13, more preferentially between 9 and 12. All the constituents are mixed with stirring for a length of time which may vary depending on the temperature used and the specific composition targeted, for example for a time which may vary between 1 min and 6 h, at a temperature of between 20° C. and 90° C., preferentially between 20 and 60° C. A person skilled in the art will know how to adjust the molar amounts of the precondensed resin based on aromatic polyphenol A2 and on compound A1 in order to obtain crosslinking and a concentration suitable for the desired use, notably as a function of the nature of the precondensed resin based on aromatic polyphenol A2.

In a second embodiment, use is made of a precondensed resin as described previously, that is to say based on:
at least one compound A1, compound A1 being chosen from:
a compound A11 comprising at least two functions, one of these functions being a hydroxymethyl function and the other being an aldehyde function or a hydroxymethyl function, or
a compound A12 comprising at least one aldehyde function, or
a mixture of a compound A11 and of a compound A12; and
at least one aromatic polyphenol A2 comprising at least one aromatic nucleus bearing at least two hydroxyl functions in the meta position relative to each other, the two positions ortho to at least one of the hydroxyl functions being unsubstituted, for example phloroglucinol.

In this second embodiment, the precondensed resin based on aromatic polyphenol in accordance with the invention is prepared under conditions analogous to the precondensed resin based on aromatic polyphenol of the first embodiment. Then, this precondensed resin based on aromatic polyphenol according to the invention A2 is gradually mixed with compound A1 under conditions analogous to those of the first embodiment. Here too, a person skilled in the art will know how to adjust the molar amounts of precondensed resin based on aromatic polyphenol A2 and on compound A1 in order to obtain crosslinking and a concentration suitable for the desired use, notably as a function of the nature of the precondensed resin based on aromatic polyphenol A2.

In a third embodiment, use is made of an aromatic polyphenol A2 according to the invention in the form of a single molecule, for example phloroglucinol.

In a first variant, the thermosetting resin is obtained by:
mixing the aromatic polyphenol A2 in the form of a single molecule in a basic solvent preferably having a pH of between 8 and 13, more preferentially between 9 and 12,
then adding compound A1.

In particular, the aromatic polyphenol A2 is firstly mixed in a basic solvent, such as an aqueous sodium hydroxide solution, preferably having a pH of between 8 and 13, more preferentially between 9 and 12.

In some cases, for example at relatively high concentrations or in the case of an acidic solvent, a person skilled in the art may find cause to add a thickener, for example carboxymethylcellulose, or a gelling agent, for example a gelatin, in order to limit the sedimentation of the aromatic polyphenol A2.

Then, compound A1 is added. In particular, compound A1 is gradually added under conditions analogous to those of the first embodiment.

In a second variant, the thermosetting resin is obtained by:
mixing compound A1 in a basic solvent preferably having a pH of between 8 and 13 and more preferentially between 9 and 12,
then adding the aromatic polyphenol A2 in the form of a single molecule.

In particular, compound A1 is first mixed in an aqueous solution, preferably in a basic solvent, such as an aqueous sodium hydroxide solution, preferably having a pH of between 8 and 13, more preferentially between 9 and 12. Then, the aromatic polyphenol A2 is added and the components are mixed under conditions analogous to those of the first embodiment.

A molar amount n2 of aromatic polyphenol A2 and a molar amount n1 of compound A1 are mixed such that $0.3 \leq (n2*N2)/(n1*N1) \leq 3$, and preferably $1 < (n2*N2)/(n1*N1) \leq 2$.

In each of the three preceding embodiments, the aromatic polyphenol could be entirely or partially replaced with an aromatic monophenol comprising at least one six-membered aromatic nucleus bearing a single hydroxyl function, the two positions ortho to the hydroxyl function being unsubstituted, or at least one position ortho to and the position para to the hydroxyl function being unsubstituted.

In this case, in the third embodiment described above, in which use is made of compounds in the form of single molecules, a molar amount n2 of aromatic polyphenol A2 and/or a molar amount n'2 of aromatic monophenol A2' and a molar amount n1 of compound A1 would then be mixed such that $0.3 \leq [(n2*N2)+(n'2*N'2)]/(n1*N1) \leq 3$, and preferably $1 < [(n2*N2)+(n'2*N'2)]/(n1*N1) \leq 2$.

In any one of these three embodiments, the partially crosslinked thermosetting resin is generally diluted in water before being added to the unsaturated elastomer latex or latices (if there are several), in order to form the aqueous adhesive composition of the invention, according to a general procedure which is well known to those skilled in the art in the field of RFL adhesives.

Preferably, during this step of forming the aqueous adhesive composition, it will be ensured that the aqueous adhesive composition has a pH of between 8 and 13, more preferentially between 9 and 12, so as to limit any potential precipitation of the, or of some, unsaturated elastomer latex (latices).

Thus, in the event that, during the resinification step preceding this step of forming the aqueous adhesive composition, use was made of an acidic or neutral solvent or a basic solvent which was neutralized, a base will be added that makes it possible to obtain a pH of between 8 and 13, more preferentially between 9 and 12, prior to the addition of the unsaturated elastomer latex (latices), so as to limit any potential precipitation of the, or of some, unsaturated elastomer latex (latices).

For example, the constituents of the adhesive composition are added in the following order: the water, possible water-soluble additives (for example aqueous ammonia), the latex or latices (in any order) and the partially crosslinked thermosetting resin (diluted).

The combination is mixed with stirring for 1 to 30 min, for example at 20° C.

During a final manufacturing step, referred to as maturation step, the aqueous adhesive composition is generally stored at room temperature (23° C.) for a maturation time which may typically range from 1 to several hours, indeed even several days, before it is finally used.

Conductive Element According to the Invention

The invention also relates to a coated conductive element as defined previously. Such a conductive element is coated by electroplating with an adhesive layer based on the adhesive composition.

The conductive element may have any size and/or any geometrical shape. It may notably be filiform or in the form of a beam, a plate, a grate or a metal fabric.

In a preferred embodiment intended to be used in the tyre sector, the conductive element is a metallic element, preferably a wire element.

The metal wire element may comprise, in one embodiment, a single elementary metallic monofilament. In another embodiment, the metal wire element comprises several elementary metallic monofilaments assembled together, for example by braiding or twisting. Among the metal wire elements comprising several elementary metallic monofilaments, examples that will be mentioned include layered cables and multistrand cables. Each elementary metallic monofilament is unitary, that is to say that the constituents of each elementary metallic monofilament are inseparable from each other.

More preferentially, the or each elementary metallic monofilament comprises a steel core. The steel core is monolithic, that is to say that it is, for example, made as one piece or moulded.

The term "elementary monofilament" means the longilinear elements of great length relative to their cross section, whatever their shape, for example circular, oblong, rectangular or square, or even flat, it being possible for this monofilament to be rectilinear or non-rectilinear, for example twisted or wavy. When it is of circular shape, the diameter of each monofilament is preferably less than 5 mm. Preferably, the or each elementary monofilament has a circular cross section with a diameter of between 0.05 mm and 0.50 mm.

In one variant, the metal element is a strip, a band or a ribbon which has a great length relative to its thickness. The thickness of such metal elements is preferably less than 2 mm, more preferentially less than 1 mm. Even more preferentially, this thickness is between 0.1 and 0.8 mm, in particular in a range from 0.15 to 0.5 mm, even more particularly in a range from 0.2 to 0.5 mm, even more particularly in a range from 0.25 to 0.45 mm or in a range from 0.15 to 0.35 mm. The width of such metal elements is between 1 and 15 mm, more preferentially greater than 1 mm and less than or equal to 10 mm, even more preferentially in a range from 2.5 to 10 mm, even more preferentially from 2.5 to 5 mm.

In one embodiment, the adhesive layer directly coats the steel core of the or each elementary metallic monofilament. The adhesive layer coats at least a portion of the or each elementary metallic monofilament. Thus, the adhesive layer can partially or completely coat the or each elementary metallic monofilament. Thus, in the embodiment in which the metal wire element comprises a single elementary metallic monofilament, the adhesive layer can coat some portions of this monofilament or else all of it. In the embodiment in which the metal wire element comprises several elementary metallic monofilaments, the adhesive layer can coat several elementary metallic monofilaments without coating others, or else can coat solely certain portions of some or all of the elementary metallic monofilaments.

In another embodiment, the adhesive layer directly coats a layer of a metallic coating directly coating the steel core of the or each elementary metallic monofilament. The metal of the layer of the metallic coating is made from a metal other than steel.

In yet another embodiment, the adhesive layer directly coats a nonmetallic intermediate adhesive layer coating the steel core of the or each elementary metallic monofilament. In one variant of this embodiment, the nonmetallic intermediate adhesive layer directly coats the layer of the metallic coating directly coating the steel core of the or each metal wire element. The nonmetallic intermediate layer, generally known as adhesion primer, makes it possible, in combination with the adhesive layer comprising the adhesive composition, to improve the adhesion of the metal wire element to the elastomeric matrix.

In another embodiment, the adhesive layer directly coats a layer of a metallic coating directly coating the steel core of the or each elementary metallic monofilament with the adhesive layer. The metal of the layer of the metallic coating is made from a metal other than steel.

Preferably, the metal of the layer of the metallic coating directly coating at least a portion of the steel core of the or each elementary metallic monofilament is chosen from zinc, copper, tin and alloys of these metals. As examples of alloys of these metals, mention will be made of brass and bronze.

In yet another embodiment, the adhesive layer directly coats a nonmetallic intermediate adhesive layer coating the steel core of the or each elementary metallic monofilament. In one variant of this embodiment, the nonmetallic intermediate adhesive layer directly coats the layer of the metallic coating directly coating the steel core of the or each elementary metallic monofilament. The nonmetallic intermediate layer, generally known as adhesion primer, makes it possible, in combination with the adhesive layer comprising the adhesive composition, to improve the adhesion of the wire element to the elastomeric matrix. Such adhesion primers are those commonly used by a person skilled in the art for the presizing of certain textile fibres (in particular polyester, for example PET, aramid or aramid/nylon fibres). For example, use could be made of an epoxy-based primer, in particular a primer based on polyglycerol polyglycidyl ether. Use could also be made of a primer based on blocked isocyanate.

The steel may have a perlitic, ferritic, austenitic, bainitic or martensitic microstructure or a microstructure resulting from a mixture of these microstructures.

Preferably, the steel comprises a carbon content ranging from 0.2% to 1% by mass and more preferentially from 0.3% to 0.7% by mass.

In one embodiment, the steel used comprises less than 0.5%, preferably not more than 0.05%, limit included, and more preferentially not more than 0.02%, limit included, by mass of chromium.

In another embodiment using stainless steel, the steel comprises at least 0.5%, limit included, preferably at least 5%, limit included, and more preferentially at least 15%, limit included, by mass of chromium.

Use According to the Invention

The invention also relates to the use of the adhesive composition described previously.

Coating Process According to the Invention

The invention also relates to a coating process as described previously.

In one embodiment of the invention, the coating process may be a process for the electroplating of an adhesive composition onto at least one conductive element, comprising the following steps:
  the conductive element is placed in contact with the adhesive composition;
  a potential difference is applied between the conductive element and the adhesive composition so as to coat the conductive element with the adhesive layer based on the adhesive composition.

A process of dipping the metal wire element in the adhesive composition of the adhesive composition on the conductive element may also be envisaged.

Composite According to the Invention

The invention also relates to an elastomeric composite as defined previously. The elastomeric matrix is based on an elastomeric composition comprising at least one elastomer and another constituent.

Preferably, the elastomeric composition comprises a diene elastomer. An elastomer or rubber (the two terms being synonymous) of the "diene" type generally means an elastomer resulting at least partly (i.e., a homopolymer or a copolymer) from diene monomers (monomers bearing two conjugated or unconjugated carbon-carbon double bonds).

The elastomeric compositions may contain just one diene elastomer or a mixture of several diene elastomers, it being possible for the diene elastomer(s) to be used in combination with any type of synthetic elastomer other than a diene elastomer, or even with polymers other than elastomers, for example thermoplastic polymers.

In a first embodiment preferentially intended for a use in tyres, the elastomeric composition comprises a diene elastomer chosen from the group consisting of polybutadienes (BRs), natural rubber (NR), synthetic polyisoprenes (IRs), the different butadiene copolymers, the different isoprene copolymers and mixtures of these elastomers.

Such copolymers are more preferably chosen from the group consisting of butadiene/styrene copolymers (SBRs), whether the latter are prepared by emulsion polymerization (ESBRs) or solution polymerization (SSBRs), isoprene/butadiene copolymers (BIRs), isoprene/styrene copolymers (SIRs) and isoprene/butadiene/styrene copolymers (SBIRs).

In a second embodiment preferentially intended for use in belts, the elastomeric composition comprises an elastomer chosen from the group consisting of an elastomer of α-olefin ethylene type, a polychloroprene elastomer and mixtures of these elastomers, one or more other elastomers. The elastomeric composition may also comprise one or more other components.

Advantageously, the ethylene/α-olefin type elastomer is chosen from the group consisting of ethylene-propylene copolymers (EPM), ethylene-propylene-diene copolymers (EPDM), and mixtures of these copolymers.

Preferably, the elastomeric composition comprises a reinforcing filler.

When a reinforcing filler is used, use may be made of any type of reinforcing filler known for its abilities to reinforce an elastomeric composition which can be used for the manufacture of tyres, for example an organic filler, such as carbon black, a reinforcing inorganic filler, such as silica, or else a blend of these two types of filler, notably a blend of carbon black and silica.

Any carbon black conventionally used in tyres ("tyre-grade" blacks) is suitable for use as carbon blacks. Mention will more particularly be made, for example, of the reinforcing carbon blacks of the 100, 200 or 300 series (ASTM grades).

In the case of the use of carbon blacks with an isoprene elastomer, the carbon blacks might, for example, be already incorporated in the isoprene elastomer in the form of a masterbatch (see, for example, patent applications WO 97/36724 or WO 99/16600).

As examples of organic fillers other than carbon blacks, mention may be made of functionalized polyvinylaromatic organic fillers, as described in patent applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler", or even "non-black filler", in contrast to carbon black, which is capable of reinforcing by itself alone, without any means other than an intermediate coupling agent, an elastomeric composition, in other words capable of replacing, in its reinforcing role, a conventional tyre-grade carbon black. Such a filler is generally characterized, in a known manner, by the presence of hydroxyl (—OH) groups at its surface.

The physical state in which the reinforcing inorganic filler is provided is not important, whether it is in the form of a powder, of microbeads, of granules, of beads or any other suitable densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are notably suitable for use as reinforcing inorganic fillers. The silica used may be any reinforcing silica known to a person skilled in the art, notably any precipitated or fumed silica having a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from the company Evonik, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/16837.

Finally, a person skilled in the art will understand that, as filler equivalent to the reinforcing inorganic filler described in the present section, use might be made of a reinforcing filler of another nature, notably organic nature, provided that this reinforcing filler is covered with an inorganic layer, such as silica, or else comprises functional sites, in particular hydroxyl sites, on its surface which require the use of a coupling agent in order to establish the bond between the filler and the elastomer.

Preferably, the content of total reinforcing filler (carbon black and/or reinforcing inorganic filler, such as silica) is within a range from 5 to 120 phr, more preferentially from 5 to 100 phr and even more preferentially from 5 to 90 phr.

The carbon black may advantageously constitute the sole reinforcing filler or the predominant reinforcing filler. Needless to say, it is possible to use just one carbon black or a blend of several carbon blacks of different ASTM grades. The carbon black may also be used as a blend with other reinforcing fillers and in particular reinforcing inorganic fillers as described previously, and in particular silica.

When an inorganic filler (for example silica) is used in the rubber composition, alone or as a blend with carbon black, its content is within a range from 0 to 70 phr, preferentially from 0 to 50 phr, in particular also from 5 to 70 phr, and even more preferentially this proportion ranges from 5 to 50 phr, particularly from 5 to 40 phr.

Preferably, the elastomeric composition comprises various additives.

The rubber compositions may also include all or a portion of the usual additives customarily used in elastomeric compositions intended for the manufacture of tyres, for instance plasticizers or extending oils, whether the latter are aromatic or non-aromatic in nature, pigments, protective agents, such as antiozone waxes, chemical antiozonants or antioxidants, antifatigue agents or else adhesion promoters.

Preferably, the elastomeric composition comprises a crosslinking system, more preferentially a vulcanization system.

In the first embodiment preferentially intended for use in tyres, the elastomeric composition comprises a vulcanization system.

The vulcanization system comprises a sulfur-donating agent, for example sulfur.

Preferably, the vulcanization system comprises vulcanization activators, such as zinc oxide and stearic acid.

Preferably, the vulcanization system comprises a vulcanization accelerator and/or a vulcanization retarder.

Advantageously, the composite is such that the elastomeric matrix is based on an elastomeric composition comprising a crosslinking system comprising a content of molecular sulfur ranging from 1 to 5 phr. The term "molecular sulfur" means sulfur resulting from an Sn compound with n>2. Specifically, the inventors put forward the hypothesis that there is competition between adhesion by the adhesive composition and adhesion by the copper and zinc sulfide dendrites. Now, this competition has a tendency to reduce the general level of the adhesion. The more the content of sulfur present in the elastomeric matrix is reduced, the more this competition is reduced, and the more the level of adhesion by the sole adhesive composition is promoted.

Very advantageously, the molecular sulfur content of the crosslinking system of the elastomeric composition is less than or equal to 4 phr, preferably less than or equal to 3 phr and more preferentially less than or equal to 2.5 phr. In addition to further reducing the competition between the adhesion by the adhesive composition and the adhesion by the copper and zinc sulfide dendrites, the shelf life of the elastomeric composition at room temperature is improved, avoiding the risks of prevulcanization which would arise if a higher sulfur content were used.

Very advantageously, the molecular sulfur content of the crosslinking system of the elastomeric composition is greater than or equal to 1.5 phr, preferably greater than or equal to 2 phr.

The sulfur content is measured by elemental analysis, using the Thermo Scientific Flash 2000 microanalyser. The analysis comprises a step of combustion of the sample and then a step of separation of the compounds formed.

About 1 mg of sample is introduced into the microanalyser, where it is subjected to flash combustion at 1000° C. under oxygen. The gases formed are then oxidized by virtue of the excess oxygen and of a tungstic anhydride catalyst. A step of reduction by passing over copper subsequently makes it possible to trap the excess oxygen and to reduce the nitrogen oxides to $N_2$ and also the sulfites to sulfur dioxide $SO_2$. The water is trapped and the compounds $N_2$, $CO_2$ and $SO_2$ formed are subsequently separated on a chromatographic column and then detected with a katharometer. The total sulfur is quantified by measurement of the area of the $SO_2$ peak, after calibration with standards.

The combined vulcanization accelerators, retarders and activators are used at a preferential content within a range from 0.5 to 15 phr. The vulcanization activator(s) are used at a preferential content within a range from 0.5 to 12 phr.

The actual crosslinking system is preferentially based on sulfur and on a primary vulcanization accelerator, in particular on an accelerator of the sulfenamide type. Additional to this vulcanization system are various known secondary vulcanization accelerators or vulcanization activators, such as zinc oxide, stearic acid, guanidine derivatives (in particular diphenylguanidine), and the like.

Use may be made, as (primary or secondary) accelerator, of any compound that is capable of acting as accelerator for the vulcanization of diene elastomers in the presence of sulfur, notably accelerators of the thiazole type, and also derivatives thereof, and accelerators of thiuram type and of zinc dithiocarbamate type. These accelerators are more preferentially chosen from the group consisting of 2-mercaptobenzothiazole disulfide (abbreviated as "MBTS"), N-cyclohexyl-2-benzothiazolesulfenamide (abbreviated as "CBS"), N, N-dicyclohexyl-2-benzothiazolesulfenamide (abbreviated as "DCBS"), N-(tert-butyl)-2-benzothiazolesulfenamide (abbreviated as "TBBS"), N-(tert-butyl)-2-benzothiazolesulfenimide (abbreviated as "TBSI"), zinc dibenzyldithiocarbamate (abbreviated as "ZBEC") and mixtures of these compounds. Preferably, use is made of a primary accelerator of the sulfenamide type.

In the second embodiment preferentially intended for use in belts, the crosslinking system is substantially free of sulfur, and advantageously comprises a peroxide, preferably an organic peroxide. Advantageously, the peroxide content ranges from 0.5 to 8 phr. Advantageously, the crosslinking system comprises a co-crosslinking agent, preferably sulfur or triallyl cyanurate. Advantageously, the content of the co-crosslinking agent ranges from 0.5 to 5 phr.

Tyre According to the Invention

As indicated previously, the invention also relates to a tyre. The elastomeric composite of the invention may advantageously be used to reinforce tyres for all types of vehicles, in particular passenger vehicles or industrial vehicles, such as heavy-duty vehicles.

Belt According to the Invention

As indicated previously, the invention also relates to a belt. For example, such a belt may be a power transmission belt.

The invention will be better understood on reading the following description, given solely by way of non-limiting example and with reference to the drawings, in which:

FIG. 1 is a diagram of a tyre according to the invention; and

Figure 2:
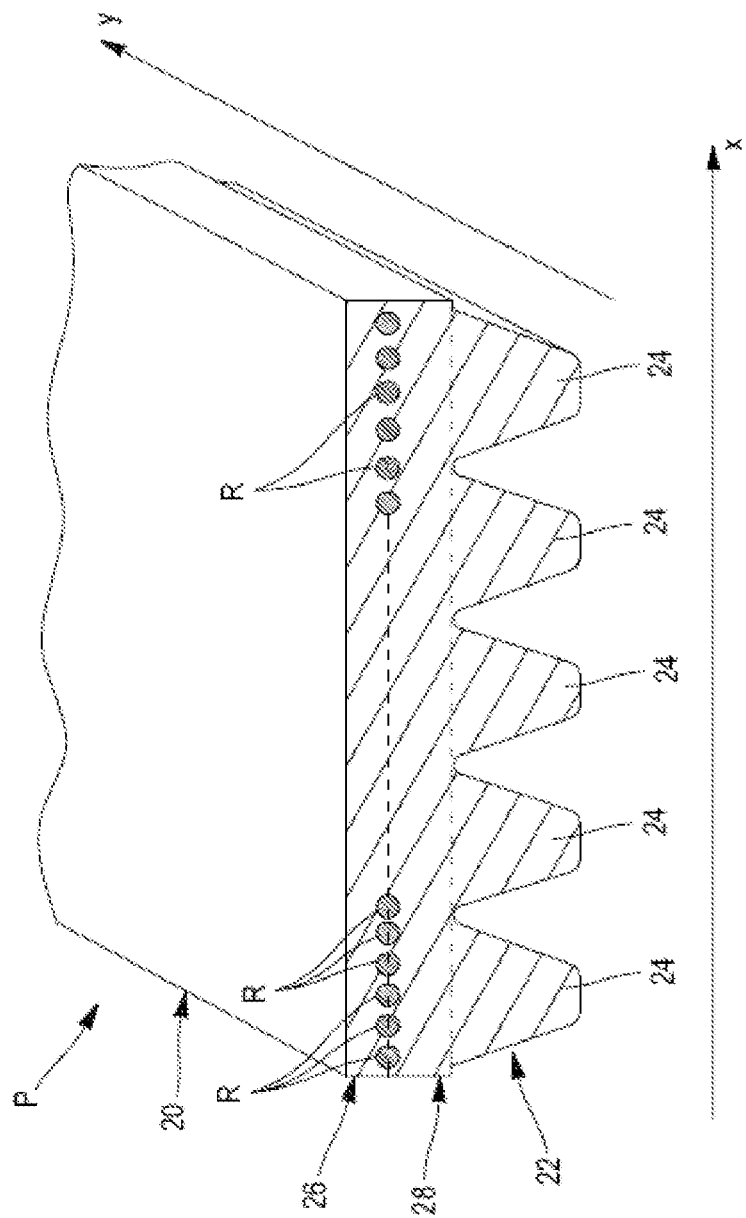
FIG. 2 is a diagram of a belt according to the invention.

FIG. 2 is a diagram of a belt according to the invention;

The appended FIG. 1 is a highly diagrammatic representation (without being to a specific scale) of a radial cross section of a tyre in accordance with the invention for a vehicle of the passenger vehicle type.

This tyre 1 includes a crown 2 reinforced by a crown reinforcement or belt 6, two sidewalls 3 and two beads 4, each of these beads 4 being reinforced with a bead wire 5. The crown 2 is surmounted by a tread, not represented in this schematic figure. A carcass reinforcement 7 is wound around the two bead wires 5 in each bead 4, the turn-up 8 of this reinforcement 7 being, for example, positioned towards the outside of the tyre 1, which is represented here fitted onto its wheel rim 9. The carcass reinforcement 7 is, in a manner known per se, formed of at least one ply reinforced with "radial" cords, for example made of textile, that is to say that these cords are positioned virtually parallel to each other and extend from one bead to the other so as to form an angle of between 80° and 90° with the median circumferential plane (plane perpendicular to the axis of rotation of the tyre which is located midway between the two beads 4 and passes through the middle of the crown reinforcement 6).

This tyre 1 of the invention has, for example, the essential feature that at least a crown reinforcement 6 includes a conductive element, in this instance a coated metal wire element or an elastomeric composite according to the invention. According to another possible exemplary embodiment of the invention, it is, for example, the bead wires which might be entirely or partially composed of a conductive element, in this instance a coated metal wire element.

FIG. 2 depicts a power transmission belt P. The power transmission belt P is intended for driving any member in rotation. The power transmission belt P comprises an elastomeric body 20 made from an elastomeric matrix and in which coated metallic reinforcing elements R are embedded. The power transmission belt P also comprises a mechanical drive layer 22 arranged in contact with the elastomeric body 20. The mechanical drive layer 22 is provided with several ribs 24 that each extend along a general direction Y substantially perpendicular to a longitudinal direction X of the belt P. Each rib 24 has a trapezoidal shape in cross section. The general directions of the ribs 24 are substantially parallel to each other. The ribs 24 extend over the entire length of the belt P. These ribs 24 are intended to be engaged in recesses or grooves of complementary shape, for example borne by pulleys on which the belt is intended to be mounted.

The elastomeric body 20 is formed on the one hand by a first elastomeric layer 26 made from a first elastomeric matrix and on the other hand by a second elastomeric layer 28 made from a second elastomeric matrix. The mechanical drive layer 22 is formed by a third layer made from a third elastomeric matrix.

Each first and second elastomeric matrix is based, respectively, on a first and second elastomeric composition, each comprising a reinforcing filler, in this instance carbon black (10 to 100 phr), an $\alpha$, $\beta$-unsaturated organic acid metal salt, in this instance zinc monomethacrylate (2 to 50 phr), an agent for dispersing the reinforcing filler (1 to 10 phr), an antioxidant (0.5 to 8 phr), an organic peroxide (0.5 to 8 phr), a co-crosslinking agent (0.5 to 5 phr by weight) and a plasticizer (1 to 20 phr by weight).

At least one of the first and second elastomeric compositions, and thus the elastomeric body 20, also comprises at least one elastomer chosen from the group consisting of an elastomer of $\alpha$-olefin ethylene type, a polychloroprene (CR) elastomer and mixtures of these elastomers. In the present case, each first and second elastomeric composition comprises a mixture of natural rubber (NR) and of an ethylene-propylene-diene copolymer (EPDM), the proportion of natural rubber being less than 30 phr.

The third elastomeric material based on a third elastomeric composition comprising at least one elastomer chosen from the group consisting of an ethylene/$\alpha$-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and mixtures of these elastomers. In the present case, the elastomer of the elastomeric composition of the third elastomeric matrix is chosen from the group consisting of an ethylene/$\alpha$-olefin type elastomer, a polychloroprene elastomer (CR), a polybutadiene (BR), a natural rubber (NR), a butadiene-styrene copolymer (SBR) and mixtures of these elastomers. In this instance, the elastomer of the elastomeric composition of the third elastomeric matrix is an ethylene/$\alpha$-olefin type elastomer, for example an ethylene-propylene copolymer (EPM), an ethylene-propylene-diene copolymer (EPDM) or a mixture of these copolymers. The belt P according to the invention has, for example, the essential of including several coated conductive elements, in this instance metal wire elements, R and an elastomeric composite 20 according to the invention.

Needless to say, the invention relates to the objects described previously, namely the elastomeric composite and the tyre or belt comprising it, both in the uncured state (before crosslinking) and in the cured state (after crosslinking).

Comparative Tests
Adhesion Test

Each conductive wire element comprises a single elementary metallic monofilament comprising a steel core which has been coated with a metallic layer of brass. More preferentially, the or each elementary metallic monofilament comprises a steel core. The steel comprises for example from 0.2% to 1.2%, preferably from 0.3% to 1% and more preferentially from 0.3% to 0.7% of carbon by mass. The steel may also comprise specific alloying elements such as Cr, Ni, Co, V, or various other known elements (see, for example, Research Disclosure 34984—"Micro-alloyed steel cord constructions for tyres"—May 1993; Research Disclosure 34054—"High tensile strength steel cord constructions for tyres"—August 1992). In the present instance, a conventional steel containing 0.7% of carbon is used.

Each metal wire element was coated with the test adhesive composition according to a conventional dipping process or an electroplating process according to the invention. Each coated conductive wire element was dried in a drying oven at 180° C. for 30 seconds. The adhesive composition was then crosslinked by passing the coated steel reinforcing elements through a treatment furnace at 240° C. for 30 seconds. Next, each steel reinforcing element thus coated was embedded in an elastomeric matrix and the composite thus formed was vulcanized by means of a thermal vulcanization treatment.

In the present case, the elastomeric matrix is based on an elastomeric composition comprising 100 phr of natural rubber, 70 phr of series 300 carbon black, 1.5 phr of N-1,3-dimethylbutyl-N-phenyl-para-phenylenediamine, 1 phr of a cobalt salt, and a crosslinking system comprising 0.9 phr of stearic acid, 2.2 phr of insoluble molecular sulfur, 0.8 phr of N-tert-butyl-2-benzothiazole sulfamide and 7.5 phr of ZnO.

More precisely, the vulcanized elastomeric matrix is a block of rubber consisting of two plates with dimensions of 200 mm×12.5 mm and a thickness of 7 mm, applied one on the other before curing (the thickness of the resulting block is then 14 mm). It is during the manufacture of this block that the coated conductive wire elements (15 lengths in total) are trapped between the two rubber plates in the uncured state, at an equal distance and allowing one end of the conductive wire element to protrude on either side of these plates by a length sufficient for subsequent pulling. The block including the conductive wire elements is then placed in a suitable mould and then cured under pressure. The curing time and temperature are adapted to the targeted test conditions and left to the initiative of the person skilled in the art; by way of example, in the present case, the curing of the block is performed at 160° C. for 20 minutes.

Composite T0 is a control composite comprising brass-plated steel monofilaments free of adhesive layer.

Composite T1 is a composite comprising brass-plated steel monofilaments coated with an adhesive layer comprising an adhesive composition comprising a resin based on phloroglucinol and 1,4-benzenedicarboxaldehyde.

Composite C1 is a composite comprising brass-plated steel monofilaments coated with an adhesive layer comprising an adhesive composition comprising $Na_3PO_4$ and a resin based on phloroglucinol and 1,4-benzenedicarboxaldehyde.

The levels of adhesion are characterized by measuring the tear force to separate the coated steel reinforcing elements of each composite just after cooling after curing (denoted Fmax0) and the tear force to separate the coated steel reinforcing elements of each composite after thermal ageing at 55° C. under 90% humidity for 14 days (noted Fmax14). For the two tear forces (Fmax0 and Fmax14), an acceptable adhesion value was set at 100, this acceptable value corresponding to the minimum acceptable force for ensuring sufficient adhesion both initially and after thermal ageing. A value of greater than 100 indicates an improved result, i.e. a tear force greater than the minimum acceptable force. A value of less than 100 indicates a degraded result, i.e. a tear force less than the minimum acceptable force.

The adhesive compositions of the various composites described above are collated in Table 1 below, along with the corresponding results.

TABLE 1

| Adhesive compositions | T0 | T1 | C1 |
|---|---|---|---|
| Compound A1 | | | |
| 1,4-Benzenedicarboxaldehyde (1) | — | 0.89 | 0.71 |
| Compound A21/A22 | | | |
| Phloroglucinol (2) | — | 1.67 | 1.33 |
| Sodium hydroxide (3) | — | 0.76 | — |
| Elastomeric latex: | | | |
| NR (4) | — | 6.43 | 6.43 |
| SBR (5) | — | 3.24 | 3.24 |
| VP-SBR (6) | — | 6.48 | 6.48 |
| Aqueous ammonia (7) | — | 0.55 | 0.55 |
| Sodium phosphate (8) | — | — | 0.75 |
| Total solids content of the adhesive composition | — | 19.5 | 19.5 |
| Weight of water | — | 80.5 | 80.5 |
| Adhesion tests on composite | | | |
| $F_{max}0$ at 20° C. after cooling after curing | 69 | 119 | 110 |
| $F_{max}14$ at 20° C. after 14 days | NM | 88 | 113 |

(1) 1,4-Benzenedicarboxaldehyde (from the company ABCR; 98% purity);
(2) Phloroglucinol (from the company Alfa Aesar; 99% purity);
(3) Sodium hydroxide (from the company Aldrich; diluted to 30%);
(4) NR Latex ("Trang Latex" from the company Bee tex; diluted to 61% by weight);
(5) SBR Latex ("Encord-201" from the company Jubilant; diluted to 41% by weight);
(6) Vinylpyridine-styrene-butadiene latex ("VP 106S" from the Eliokem; diluted to 41%);
(7) Aqueous ammonia (from the company Aldrich; diluted to 21%);
(8) $Na_3PO_4$ sodium phosphate (from the company Aldrich; 99% purity).

The comment "NM" (meaning "not measured") indicates that the value was not measured or is meaningless.

The control composite T0 has insufficient initial adhesion on account of the relatively low sulfur content of the elastomeric matrix and of the low adhesion by the copper and zinc sulfide dendrites.

It is noted that composite C1 according to the invention has an initial adhesion $F_{max}0$ which is greater than that of the control composite T0 and which is greater than the acceptable adhesion value.

After thermal and wet ageing, it is observed that the tear force $F_{max}14$ of composite T1 decreases greatly whereas, unexpectedly, it does not undergo any reduction for composite C1 of the invention.

These tests confirm that the adhesion to an elastomeric matrix with an adhesive composition free of phosphate salt, of coated steel wire elements is deteriorated over time, whereas the adhesive composition comprising a phosphate salt makes it possible, surprisingly, to obtain a high initial adhesion, which is long-lasting.

The invention is not limited to the embodiments described previously.

It may also be envisaged to coat several elementary metallic monofilaments each comprising a steel core. In one embodiment, the elementary metallic monofilaments are assembled together and the elementary metallic monofilaments are then collectively coated with the adhesive composition. In another embodiment, each elementary metallic monofilament is individually coated with the adhesive composition and the elementary metallic monofilaments are then assembled together.

Elementary metallic monofilaments coated with a nonmetallic intermediate adhesive layer directly coating the steel core of the elementary metallic monofilaments or the metal coating layer may also be envisaged, the layer of the adhesive composition then directly coating this nonmetallic intermediate adhesive layer or the metal coating layer.

In another embodiment not in accordance with the invention, the reinforcing element is coated with an adhesive layer based on an aqueous adhesive composition, comprising:
  at least one unsaturated elastomeric latex comprising a butadiene copolymer, a vinylpyridine-styrene-butadiene terpolymer and a natural rubber,
  at least one resin based on resorcinol and formaldehyde, and
  at least one zinc phosphate such that the zinc phosphate is at a mass content ranging from 0.15% to 0.90% of the aqueous adhesive composition.

In this embodiment not in accordance with the invention, the zinc phosphate is at a mass content ranging from 0.20% to 0.75% of the aqueous adhesive composition, which avoids the need to use a dispersant.

Notably, in contrast with the invention, zinc phosphate is not water-soluble under standard temperature and pressure conditions. Although not making it possible to render the adhesion long-lasting, the zinc phosphate nevertheless makes it possible, while at the same time keeping the composite stable, to give the coated reinforcing element improved corrosion resistance relative to the same reinforcing element coated with an analogous aqueous adhesive composition free of zinc phosphate.

The invention claimed is:

1. An adhesive composition comprising:
   a phosphate salt selected from the group consisting of sodium phosphate, potassium phosphate and mixtures thereof; and
   at least one resin based on:
      at least one compound A1 selected from the group consisting of:
         a compound A11 comprising at least two functions, one function being a hydroxymethyl function and one function being an aldehyde function or a hydroxymethyl function, and
         a mixture of a compound A11 and of a compound A12, wherein compound A12 comprises at least one aldehyde function, and
      at least one phenol A21,
   wherein compound A11 corresponds to general formula (II'a1) or (II'a2):

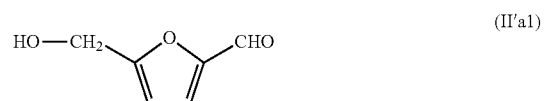

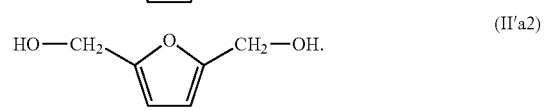

2. The adhesive composition according to claim 1, wherein a water content of the adhesive composition is between 70% and 95% by weight.

3. The adhesive composition according to claim 1, wherein the phosphate salt is sodium phosphate.

4. The adhesive composition according to claim 1, wherein a pH of the adhesive composition is strictly greater than 7.

5. The adhesive composition according to claim 1, wherein compound A12 comprises at least one aromatic nucleus bearing at least one aldehyde function.

6. The adhesive composition according to claim 5, wherein the at least one aromatic nucleus of compound A12 bears two aldehyde functions.

7. The adhesive composition according to claim 5, wherein compound A12 is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures thereof.

8. The adhesive composition according to claim 1, wherein the phenol A21 is selected from the group consisting of:
   an aromatic polyphenol A2 comprising at least one aromatic nucleus bearing at least two hydroxyl functions in the meta position relative to each other, the two positions ortho to at least one of the hydroxyl functions being unsubstituted,
   an aromatic monophenol A2' comprising at least one 6-membered aromatic nucleus bearing a single hydroxyl function, the two positions ortho to the single hydroxyl function being unsubstituted or at least one ortho position and the position para to the single hydroxyl function being unsubstituted, and
   a mixture of A2 and A2'.

9. The adhesive composition according to claim 1 further comprising a latex of at least one elastomer.

10. A coated conductive element, wherein the coated conductive element is coated with an adhesive layer based on the adhesive composition according to claim 1.

11. A tire comprising a coated conductive element according to claim 10.

12. A belt comprising a coated conductive element according to claim 10.

* * * * *